United States Patent
Townsley et al.

(10) Patent No.: US 8,086,749 B2
(45) Date of Patent: Dec. 27, 2011

(54) TECHNIQUES FOR MIGRATING A POINT TO POINT PROTOCOL TO A PROTOCOL FOR AN ACCESS NETWORK

(75) Inventors: William Mark Townsley, Nashville, TN (US); Huw Jones, Mandalay (GB); Vincent John Mammoliti, Mississauga (CA)

(73) Assignee: Cisco Technology, Inc., San Jose, CA (US)

( * ) Notice: Subject to any disclaimer, the term of this patent is extended or adjusted under 35 U.S.C. 154(b) by 159 days.

(21) Appl. No.: 12/335,841

(22) Filed: Dec. 16, 2008

(65) Prior Publication Data
US 2009/0154466 A1 Jun. 18, 2009

Related U.S. Application Data

(62) Division of application No. 11/043,636, filed on Jan. 26, 2005, now Pat. No. 7,483,996.

(60) Provisional application No. 60/631,318, filed on Nov. 29, 2004.

(51) Int. Cl.
*G06F 15/16* (2006.01)
(52) U.S. Cl. ..................... 709/230; 370/395.5
(58) Field of Classification Search .......... None
See application file for complete search history.

(56) References Cited

U.S. PATENT DOCUMENTS

| | | | |
|---|---|---|---|
| 5,959,972 A | 9/1999 | Hamami | |
| 6,028,862 A | 2/2000 | Russell et al. | |
| 6,125,119 A | 9/2000 | Cherukuri et al. | |
| 6,381,246 B1 | 4/2002 | Constantinof et al. | |
| 6,549,533 B1 | 4/2003 | Campbell | |
| 6,829,215 B2 | 12/2004 | Tornar | |
| 7,042,988 B2 | 5/2006 | Juitt et al. | |
| 7,082,101 B2 | 7/2006 | Kim et al. | |
| 7,085,579 B2 * | 8/2006 | Mizutani et al. | 455/512 |
| 7,124,189 B2 | 10/2006 | Summers et al. | |
| 7,149,224 B1 * | 12/2006 | Krishnamurthy | 370/401 |

(Continued)

FOREIGN PATENT DOCUMENTS

CN 101218575 A 11/2005

(Continued)

OTHER PUBLICATIONS

EP, Official Action, Supplementary European Search Report and Annex to European Search Report dated Jul. 27, 2009 (9 pages).

(Continued)

*Primary Examiner* — Bunjob Jaroenchonwanit
(74) *Attorney, Agent, or Firm* — Patent Capital Group

(57) ABSTRACT

Techniques for managing a persistent session associated with a particular Media Access Control (MAC) include determining at a broadband remote access server whether an elapsed time since a data packet is received with the particular MAC address exceeds a threshold time. If so, then point-to-point protocol (PPP) control data is sent in a data link protocol payload that is encapsulated in a data packet with an Ethernet destination field that indicates the particular MAC address. The PPP control data indicates a request for an echo. It is determined whether a data packet with the particular MAC address in an Ethernet source field is received within a particular time interval. If not, then a session associated with the particular MAC address is terminated. These techniques allow PPP control plane functionality while utilizing IP over Ethernet for the data plane.

14 Claims, 13 Drawing Sheets

U.S. PATENT DOCUMENTS

| | | | |
|---|---|---|---|
| 7,197,550 | B2 | 3/2007 | Cheline et al. |
| 7,340,519 | B1 | 3/2008 | Golan et al. |
| 7,373,661 | B2 | 5/2008 | Smith et al. |
| 7,389,534 | B1 | 6/2008 | He |
| 7,420,933 | B2 | 9/2008 | Booth, III et al. |
| 7,421,736 | B2 | 9/2008 | Mukherjee et al. |
| 7,469,282 | B2 | 12/2008 | Taylor et al. |
| 7,469,298 | B2 * | 12/2008 | Kitada et al. ............... 709/236 |
| 7,483,996 | B2 | 1/2009 | Townsley et al. |
| 7,489,693 | B2 * | 2/2009 | Xu ............... 370/395.5 |
| 7,535,856 | B2 | 5/2009 | Booth, III et al. |
| 7,590,148 | B2 * | 9/2009 | Wu ............... 370/466 |
| 7,610,396 | B2 * | 10/2009 | Taglienti et al. ............... 709/233 |
| 7,623,504 | B2 * | 11/2009 | Phu ............... 370/349 |
| 7,936,710 | B2 * | 5/2011 | Gregorio Rodriguez et al. ............... 370/328 |
| 2001/0026553 | A1 | 10/2001 | Gallant et al. |
| 2003/0026248 | A1 * | 2/2003 | Hiroki ............... 370/352 |
| 2003/0041170 | A1 | 2/2003 | Suzuki |
| 2003/0055987 | A1 * | 3/2003 | Ji et al. ............... 709/227 |
| 2003/0110268 | A1 | 6/2003 | Kermarec et al. |
| 2003/0110276 | A1 | 6/2003 | Riddle |
| 2003/0217126 | A1 | 11/2003 | Polcha et al. |
| 2004/0006708 | A1 | 1/2004 | Mukherjee et al. |
| 2004/0044789 | A1 | 3/2004 | Angel et al. |
| 2004/0052263 | A1 | 3/2004 | Xu |
| 2004/0078621 | A1 | 4/2004 | Talaugon et al. |
| 2004/0156313 | A1 | 8/2004 | Hofmeister et al. |
| 2004/0167978 | A1 * | 8/2004 | Kitayama ............... 709/224 |
| 2005/0021770 | A1 * | 1/2005 | Helm et al. ............... 709/228 |
| 2005/0058132 | A1 * | 3/2005 | Okano et al. ............... 370/389 |
| 2005/0097203 | A1 | 5/2005 | Unbehagen et al. |
| 2005/0114490 | A1 | 5/2005 | Redlich et al. |
| 2005/0135238 | A1 | 6/2005 | Taylor |
| 2005/0135269 | A1 | 6/2005 | Saint-Hilaire et al. |
| 2005/0193103 | A1 | 9/2005 | Drabik |
| 2005/0213513 | A1 | 9/2005 | Ngo et al. |
| 2006/0018252 | A1 | 1/2006 | Sridhar et al. |
| 2006/0018300 | A1 | 1/2006 | Westberg et al. |
| 2006/0056384 | A1 | 3/2006 | Ishii et al. |
| 2006/0182037 | A1 | 8/2006 | Chen et al. |
| 2006/0187855 | A1 | 8/2006 | Booth, III et al. |
| 2006/0187856 | A1 | 8/2006 | Booth, III et al. |
| 2006/0187937 | A1 | 8/2006 | Townsley et al. |
| 2007/0121833 | A1 * | 5/2007 | Xiong et al. ............... 379/100.14 |

FOREIGN PATENT DOCUMENTS

| | | |
|---|---|---|
| CN | 101099352 A | 2/2006 |
| EP | 0 917 318 A2 | 5/1999 |
| EP | 1844402 A2 | 10/2007 |
| EP | 1856861 A1 | 11/2007 |
| WO | WO 99/52244 A1 | 10/1999 |
| WO | WO 2006-057849 A2 | 6/2006 |
| WO | WO 2006-089214 A1 | 8/2006 |

OTHER PUBLICATIONS

Chinese, The First Office Action, Filing No. 2005800310543, dated Jul. 10, 2009; 13 pages.

Chinese, The First Office Action, Filing No. 2006800017167, dated Oct. 9, 2009; 12 pages.

PCT, "International Preliminary Report on Patentability and Written Opinion of the International Searching Authority," for Application No. PCT/US2005/041225, dated Oct. 16, 2007, 8 pages.

PCT, "International Preliminary Report on Patentability and Written Opinion of the International Searching Authority," for PCT Application No. PCT/US2006/05817, dated Aug. 21, 2007, 4 pages.

G. Gross, et al., PPP Over AAL5, Jul. 1, 1998, Publisher: ietf.org, Published in: Internet, 13 pages.

L. Mamakos et al., A Method for Transmitting PPP Over Ethernet (PPPoE), Feb. 1, 1999, Publisher: ietf. org, Published in: Internet, 17 pages.

European Search Report for Application No. PCT/US2005/041225, dated Aug. 5, 2009, 9 pages.

U.S. Appl. No. 12/555,777, filed Sep. 8, 2009, entitled "System and Method for Providing Dynamic Provisioning in a Network Environment," Inventor(s): Wojciech Dec, et al.

PRC Oct. 9, 2009 Response to First Office Action from Chinese Application No. 200680001716.7; 79 pages.

PRC Jul. 9, 2009 Response to First office Action from Chinese Application No. 200580031054.3; 66 pages.

PRC May 6, 2011 SIPO Second Office Action from Chinese Application No. 200680001716.7; 8 pages.

PRC May 6, 2011 SIPO Second Office Action from Chinese Application No. 200580031054.3; 11 pages.

PRC Jul. 21, 2011 Response to SIPO Second Office Action from Chinese Application No. 200580031054.3; [English translation only of Response and Pending Claims]; 10 pages.

PRC Jul. 21, 2011 Response to SIPO Second Office Acton from Chinese Application No. 200680001716.7; [English translation only of Response and Pending Claims]; 4 pages.

USPTO Jul. 5, 2011 Notice of Allowance from U.S. Appl. No. 11/281,269.

USPTO Mar. 3, 2011 Final Rejection for U.S. Appl. No. 11/281,259.

Jun. 3, 2011 After-Final Response to USPTO Mar. 3, 2011 Final Rejection for U.S. Appl. No. 11/281,269.

PCT, "Notification of Transmittal of the International Search Report and the Written Opinion of the International Searching Authority, or the Declaration," for PCT Application No. PCT/US2006/05817, dated Jun. 26, 2006, 8 pages.

J. Heinanen et al., "Using RADIUS for PE-Based VPN Discovery," draft-ietf-L2VPN-radius-pe-discovery-00.txt; Publisher: IETF.org (Internet), Feb. 2004; 9 pages.

J. Heinanen et al., "Using RADIUS for PE-Based VPN Discovery," draft-ietf-L2VPN-radius-pe-discovery-02.txt; Publisher: IETF.org (Internet), Oct. 2005; 17 pages.

E. Rosen et al., "Provisioning, Autodiscovery, and Signaling in L2VPNs," draft-ietf-L2VPN-signaling-08.txt; Publisher: IETF.org (Internet), May 2006; 37 pages.

L. Martini et al., "Encapsulation Methods for Transport of Ethernet Over MPLS Networks"; www.rfc-editor.org/rfc/rfc4448.txt; Apr. 2006; 23 pages.

Indian Patent Application Serial No. 1983/DELNP/2007 filed Nov. 15, 2005, entitled "Techniques for Migrating a Point to Point Protocol to a Protocol for an Access Network," Applicant: Cisco Technology, Inc.; 53 pages.

Indian Patent Application Serial No. 4777/DELNP/2007 filed Feb. 17, 2006, entitled "Techniques for for Oversubscribing Nodes for Virtual Private Networks," Applicant: Cisco Technology, Inc.; 80 pages.

* cited by examiner

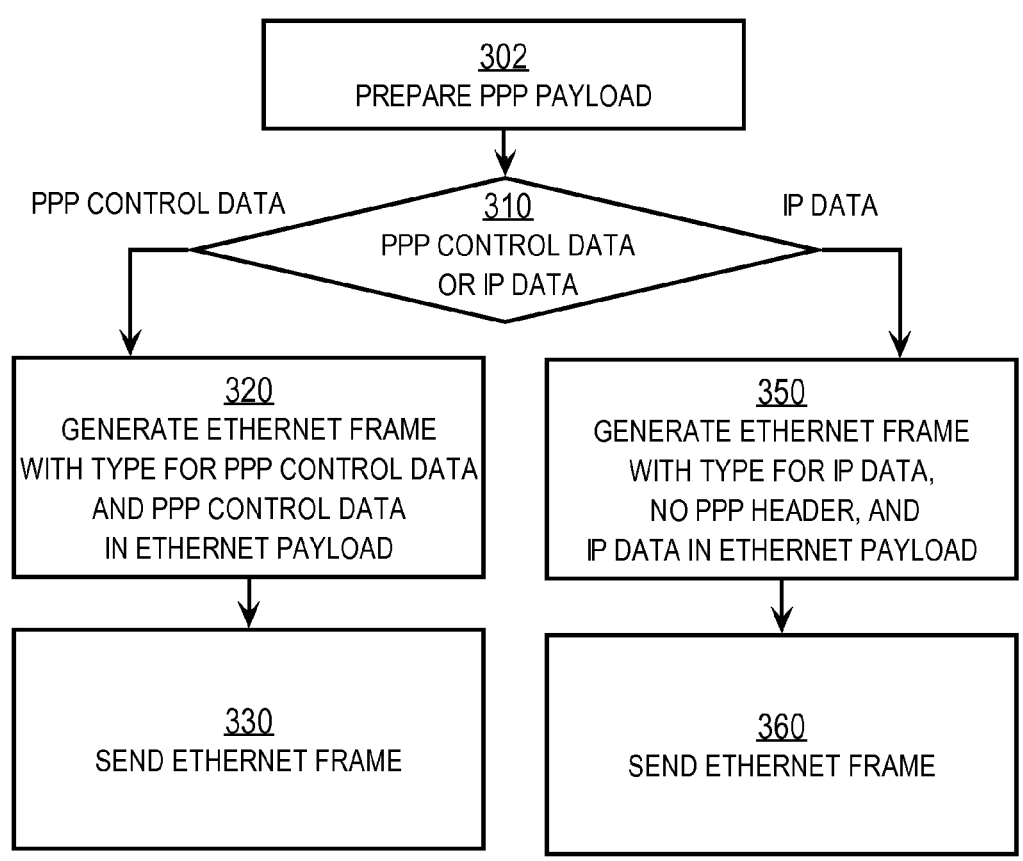

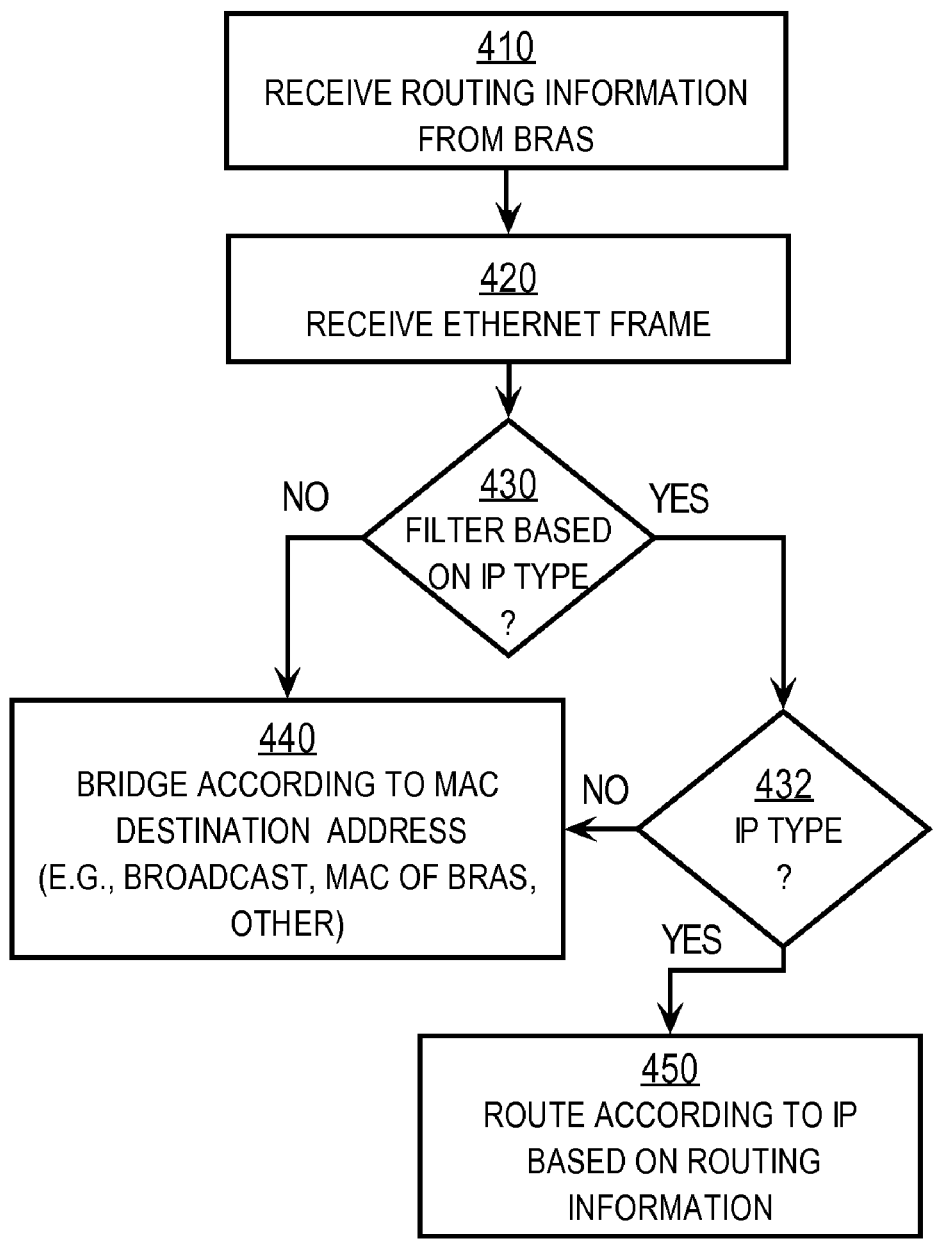

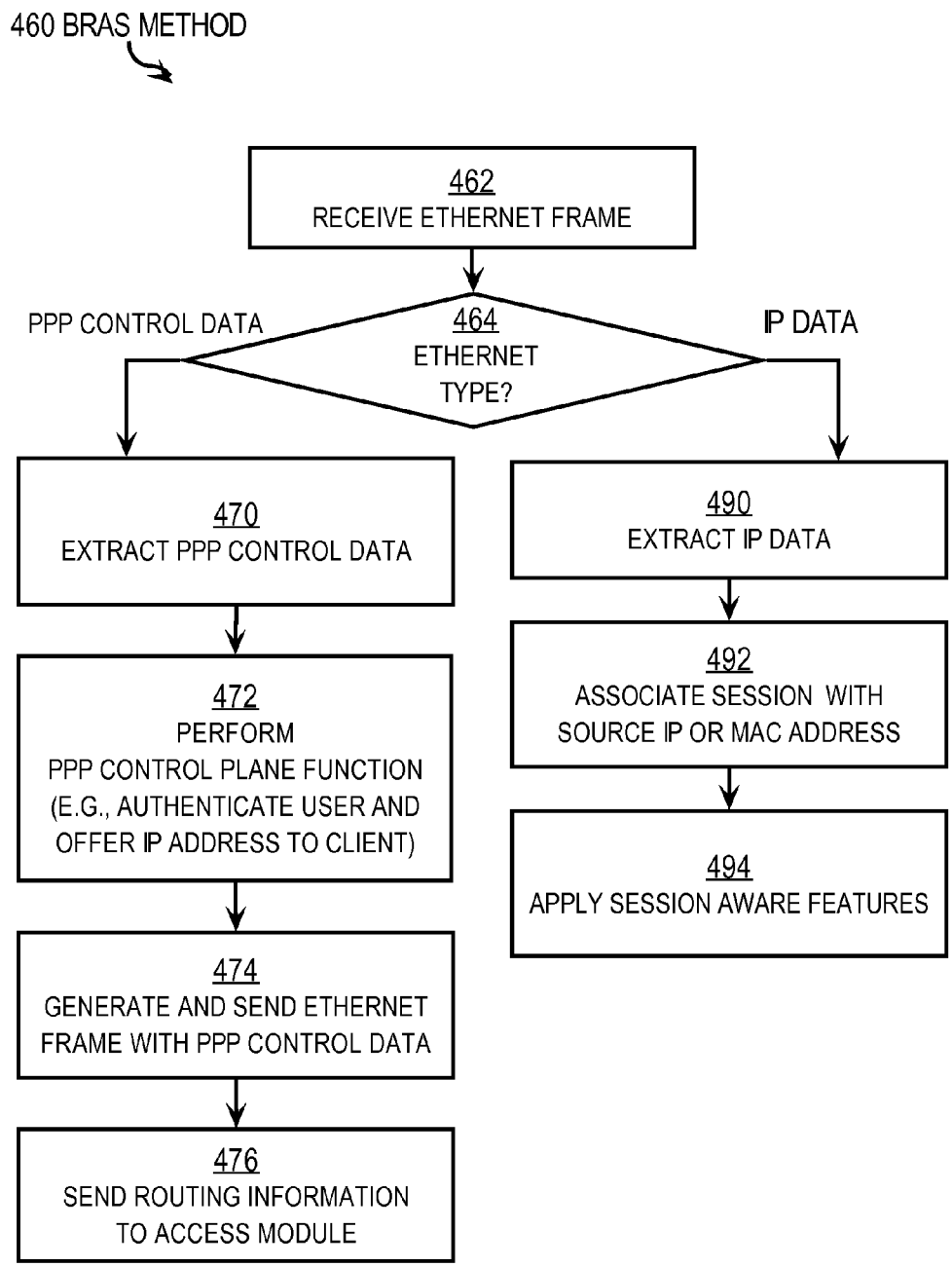

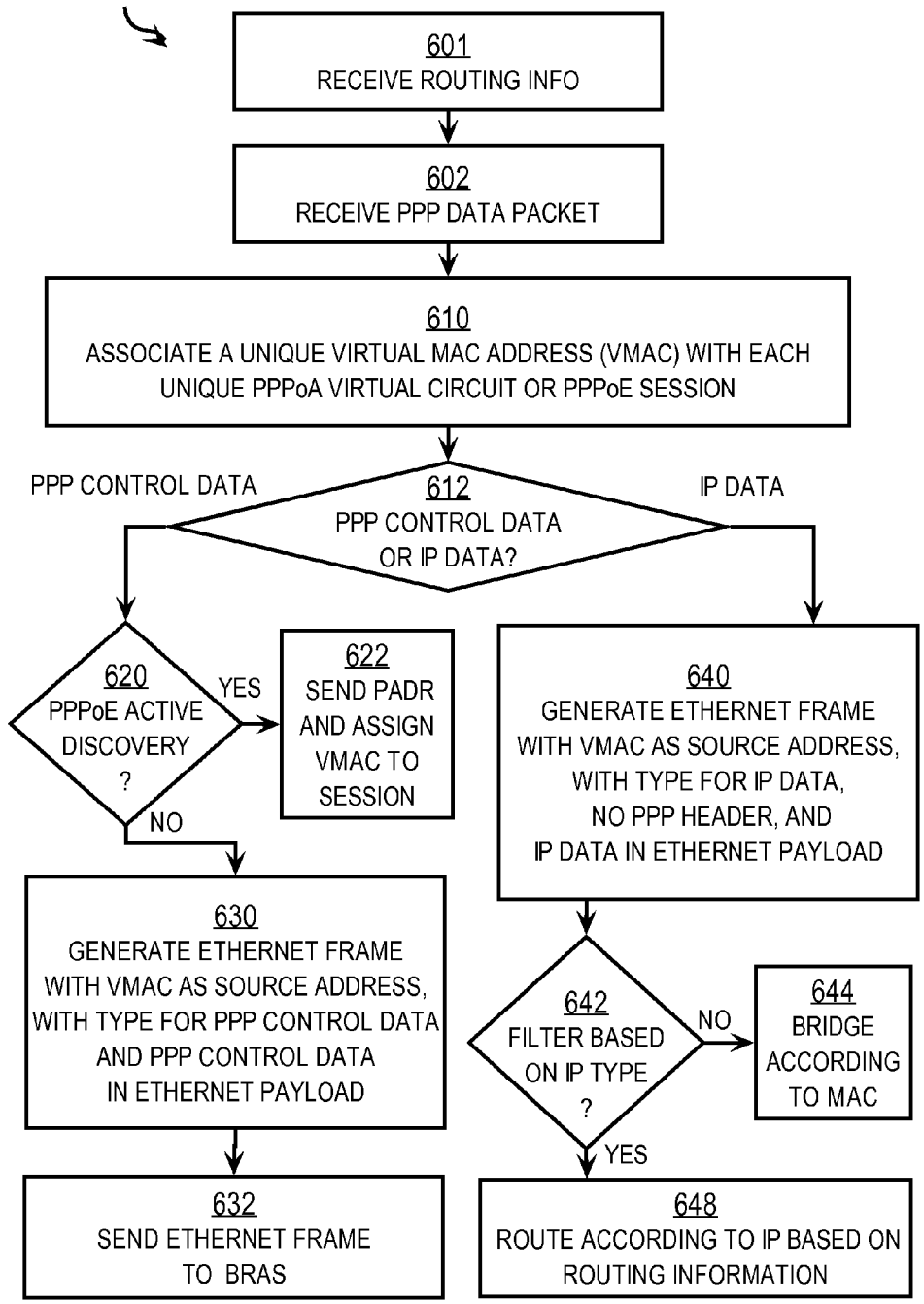

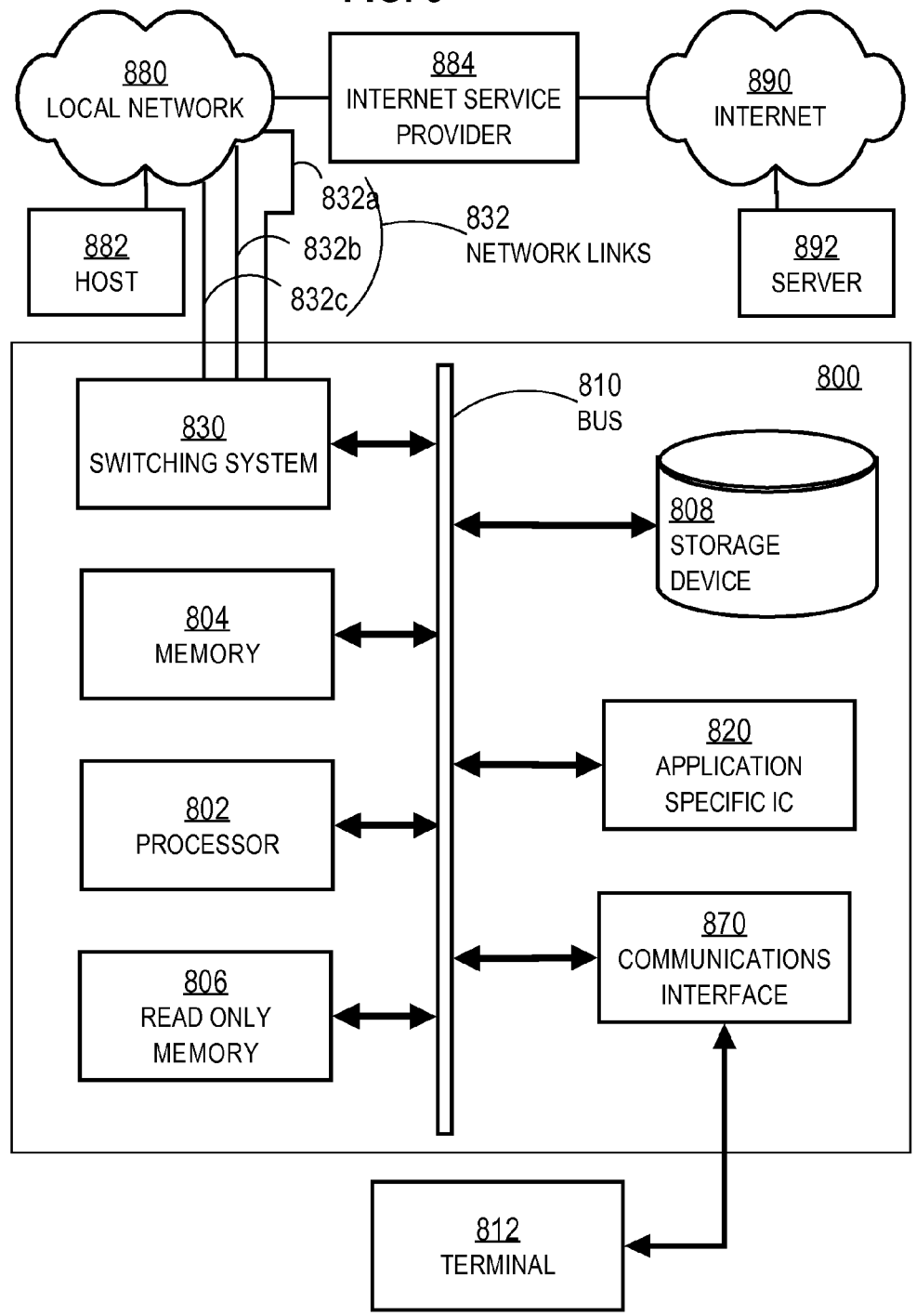

TECHNIQUES FOR MIGRATING A POINT TO POINT PROTOCOL TO A PROTOCOL FOR AN ACCESS NETWORK

CROSS-REFERENCE TO RELATED APPLICATIONS

This application claims benefit of Provisional Appln. 60/631,318, filed Nov. 29, 2004, the entire contents of which are hereby incorporated by reference as if fully set forth herein, under 35 U.S.C. §119(e). This application claims benefit as a Divisional of application Ser. No. 11/043,636, filed Jan. 26, 2005, the entire contents of which are hereby incorporated by reference as if fully set forth herein, under 35 U.S.C. §121.

BACKGROUND OF THE INVENTION

1. Field of the Invention

The present invention relates to migrating client protocols for access to a wide area network to an arbitrary protocol, and, in particular, migrating point to point protocol PPP, such as PPP over Ethernet (PPPoE) or PPP over Asynchronous Transfer Mode (PPPoA) to the Internet Protocol (IP) over Ethernet.

2. Description of the Related Art

Networks of general purpose computer systems connected by external communication links are well known. The networks often include one or more network devices that facilitate the passage of information between the computer systems. A network node is a network device or computer system connected by the communication links.

Information is exchanged between network nodes according to one or more of many well known, new or still developing protocols. In this context, a protocol consists of a set of rules defining how the nodes interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model. The OSI Reference Model is generally described in more detail in Section 1.1 of the reference book entitled *Interconnections Second Edition*, by Radia Perlman, published September 1999, which is hereby incorporated by reference as though fully set forth herein.

Communications between nodes are typically effected by exchanging discrete packets of data. Each packet typically comprises 1] header information associated with a particular protocol, and 2] payload information that follows the header information and contains information that may be processed independently of that particular protocol. In some protocols, the packet includes 3] trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, as defined by the Open Systems Interconnection (OSI) Reference Model.

Some protocols span the layers of the OSI Reference Model. For example, the Ethernet local area network (LAN) protocol includes both layer 1 and layer 2 information. The International Electrical and Electronics Engineers (IEEE) 802.3 protocol, an implementation of the Ethernet protocol, includes layer 1 information and some layer 2 information.

One such layer 2 protocol is the Point to Point Protocol (PPP) between a host computer on a local area network and a network node that provides access to a wide area network, such as the Internet. Some protocols, including PPP, pass protocol-related information among two or more network nodes in special control packets that are communicated separately and which include a payload of information used by the protocol itself rather than a payload of data to be communicated for another application. These control packets and the processes at network nodes that utilize the control packets are said to be in another dimension, a "control plane," distinct from the "data plane" dimension that includes the data packets with payloads for other applications. For example, authentication information used to authenticate users and layer 3 address assignment information used by routers to direct data packets according to their layer 3 addresses are passed between nodes in PPP control messages in the PPP control plane.

PPP provides a standard method for transporting any of multiple protocol data packets (also called frames, datagrams and cells, and used interchangeably herein) over point-to-point links. PPP is defined in an Internet Engineering Task Force (IETF) request for comments document (RFC) numbered 1661, dated July 1994, the entire contents of which are hereby incorporated by reference as if fully set forth herein. Copies of RFC 1661 and other RFCs cited below are available at the World Wide Web domain ief.org. PPP has been used extensively to connect users at a home site to a remote network using modems and telephone copper loop infrastructure. PPP provides a robust control plane for signaling line characteristics, network protocol parameters, and user-level authentication. In large service provider networks, the user authentication models are generally well entrenched, including, but not limited to, custom-built applications for communicating policy to network equipment and to track billing information.

For applications in which multiple hosts on a shared Ethernet establish PPP sessions to multiple destinations via one or more bridging modems, a PPP over Ethernet (PPPoE) specification has been developed. PPPoE is intended to be used with broadband remote access technologies that provide a bridged Ethernet topology, when access providers wish to distinguish different users connected via the same modem to the remote network. PPP provides this distinction by opening different sessions with different users. PPPoE is described in IETF RFC 2516, the entire contents of which are hereby incorporated by reference as if fully set forth herein.

For some applications, a digital subscription line (DSL) protocol used by bridging modems is combined with an Asynchronous Transfer Mode (ATM) data link layer protocol. A specification for PPP over ATM (PPPoA) has been developed and used extensively in this context. PPPoA for IP data packets in a PPP payload is described in IETF RFC 2364, the entire contents of which are hereby incorporated by reference as if fully set forth herein.

There is a trend among network service providers to move to Ethernet and IP as the only layer two and layer three protocols between end nodes at a user site and end nodes on the remote network to which access is sought. One reason given for this trend is a desire to make use of IP-based quality of service (QoS) capabilities available in access network equipment. Another reason given is to reduce complexity because data packets can be transmitted from one portion of the network infrastructure to another without translating between layer two protocols. Another reason given is that using IP over Ethernet will improve efficiency of bandwidth utilization compared to a mixture of many protocols.

One approach is to eliminate PPP, PPPoE and PPPoA, and provide the PPP functions using IP-based functions. For example, it has been proposed to use International Electrical and Electronics Engineers standard 802.1x or web portal methods for authentication, and to use the Dynamic Host Configuration Protocol (DHCP) for assigning IP addresses. A justification offered for this approach is that, when all encapsulated data packets are IP, the multi-protocol encapsulation capability of PPP is not valuable.

There are some disadvantages to eliminating PPP. The existing IP-based functions do not perform all the functions performed by PPP. Some of these protocols would have to be extended to perform the missing functions. For example, DHCP would have to extended to perform user authentication and integration, configure link-level parameters such as maximum reception unit (MRU), included a connection "keep-alive" mechanism, among other tasks, in order to encompass all of the functionality that PPP offers today. An extant RFC on DHCP authentication is directed to authenticating the DHCP messages themselves to ensure that they did not get altered in transit, rather than authenticating the user and hooking into an Authentication, Authorization, Accounting (AAA) server like RADIUS at the BRAS to make this happen. Furthermore, DHCP authentication as described in the RFC is not available in most implementations today. Furthermore, PPP provides a mechanism for detecting when a session is active and available so that reallocation of an IP address or billing can take place on session termination. DHCP does not have any mechanism today apart from a lease timeout. As stated above, in large service provider networks, PPP-based user authentication, billing mechanisms, policy dissemination, and some other functions are generally well entrenched and costly to replace with IP-based functions.

A specific example of problems that arise in migrating remote access to IP over Ethernet infrastructure occurs with DSL/ATM data packets. For many internet service providers (ISPs) an access network lies between a DSL modem bank controlled by a DSL Access Module (DSLAM) and a Broadband Remote Access Server (BRAS) host. This access network is often based on an ATM infrastructure and uses PPPoA to connect remote users to the BRAS. If this access network is converted to a Gigabyte Ethernet infrastructure, PPPoA will fail because Gigabyte Ethernet does not support ATM protocol data packets (called ATM cells).

In one approach to resolving this problem, PPPoA data packets are translated to PPPoE data packets and then the PPPoE data packets are sent over the Gigabyte Ethernet access network. While suitable in some circumstances, there are several disadvantages to this approach. The "translated" PPPoE session does not look exactly like other PPPoE sessions at the BRAS. For example, a proposal brought to the DSL Forum (DSLForum2004.343) requires additional constraints beyond RFC 2516 on PPPoE signaling at the BRAS. Specifically, this proposal mandates sending a PPP Active Discovery Termination (PADT) message at the close of a PPPoE session, and mandates responding to unknown PPPoE source traffic with PADTs; among other changes.

Another disadvantage is that PPPoE as defined in RFC 2516 imposes a maximum transmission unit (MTU) of 1492 bytes for PPP frames carried over Ethernet. This limitation stems from the standard Ethernet maximum MTU of 1500, and the fact that the PPP and PPPoE header is 8 bytes. PPPoA typically allows a full 1500 bytes, and PPPoA equipment at customer premises may not be compliant in allowing the MTU to be reduced. Some customers stay with PPPoA primarily because of the increased MTU size. Thus even if it is possible to negotiate an MTU of 1492 with PPPoA, it is not adequate for some customers.

Consequently, PPPoA to PPPoE translation in the form being circulated at the time of this writing is not transparent to either the BRAS or the customer premises equipment (CPE).

Even if PPPoA is successfully translated to PPPoE, there are disadvantages to using PPPoE on an Ethernet access network. Many network devices on an Ethernet access network are intelligent nodes that can filter and optimize the switching of data packets based on an IP datagram in the Ethernet payload of an Ethernet data packet. These devices are stymied if the first protocol in the Ethernet payload is not IP but something else, such as PPPoE.

Based on the foregoing, there is a clear need for techniques that migrate PPP, PPPoE and PPPoA functionality to IP over Ethernet infrastructure but that do not suffer the disadvantages of the prior art approaches. In particular, there is a need for techniques that allow Ethernet data packets (also called herein Ethernet frames) to transport IP data without intervening PPP headers.

The approaches described in this section could be pursued, but are not necessarily approaches that have been previously conceived or pursued. Therefore, unless otherwise indicated herein, the approaches described in this section are not to be considered prior art to the claims in this application merely due to the presence of these approaches in this background section.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3A is a flow diagram that illustrates at a high level a method for splitting PPP traffic at a PPP client, according to an embodiment;

FIG. 4A is a flow diagram that illustrates at a high level a method for receiving PPP split data packets at an access module for an access network, according to an embodiment;

FIG. 4B is a flow diagram that illustrates at a high level a method for receiving PPP split data packets at Broadband Remote Access Server (BRAS) for an IP network, according to an embodiment;

FIG. 6A is a flow diagram that illustrates at a high level a method for splitting PPP traffic at an access network access module, such as a DSLAM, according to an embodiment;

FIG. 8 is a block diagram that illustrates a computer system configured as an intermediate network node upon which an embodiment of the invention may be implemented.

DETAILED DESCRIPTION

Figure 1A:
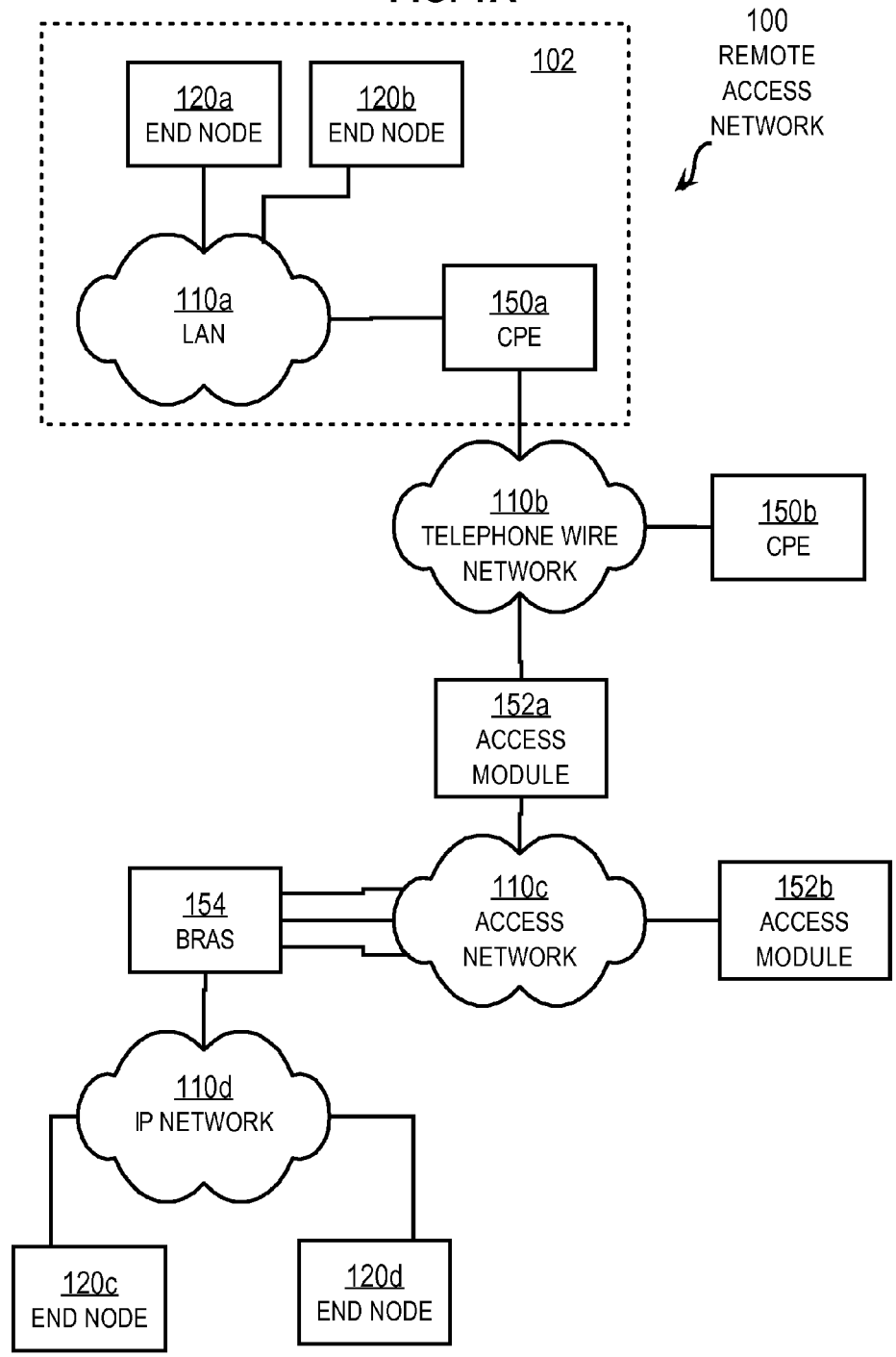
FIG. 1A is a block diagram that illustrates a remote access network, according to an embodiment.

A method and apparatus and system are described for migrating PPP functionality to an arbitrary protocol, such as to Ethernet or ATM. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

1.0 Functional Overview

In various embodiments described herein, techniques are provided that allow PPP control plane functionality while utilizing a different protocol for the data plane. For example, the PPP data plane data is sent over a first type of Ethernet packet, such as the widely popular IP over Ethernet packet, and the PPP control plane data is sent over a new type of Ethernet packet where the new type indicates PPP control plane data (simply referenced, hereinafter, as PPP control data).

In a first set of embodiments, a method for exchanging point to point protocol (PPP) information among network nodes using an arbitrary network protocol includes determining whether a payload for a point to point protocol (PPP) includes PPP control data. If it is determined that the PPP payload includes PPP control data, then an outbound protocol frame is generated with the PPP control data in a payload of the outbound protocol frame and with an outbound protocol type field that includes data that indicates PPP control data. The outbound protocol frame is sent to a server which uses the PPP control data. The outbound protocol is different from PPP and from PPP over Ethernet (PPPoE) and from PPP over Asynchronous Transfer Mode (ATM) protocol (PPPoA).

In some of embodiments of the first set, the outbound protocol is Ethernet. In some embodiments, the outbound protocol is an ATM Adaptation Layer (AAL).

In some embodiments of the first set, if it is determined that the PPP payload does not include PPP control data, then an outbound protocol frame is generated with the PPP payload in the outbound protocol payload and without a PPP header in the outbound protocol payload. The outbound protocol frame is sent over a network. In some of these embodiments, the PPP payload is an IP data packet.

In some embodiments of the first set, the server that uses the PPP control data uses the PPP control data for at least one of authenticating a particular user, provisioning a particular link with the particular user, provisioning a network layer protocol to use the particular link, and establishing a session with the particular user.

In some embodiments of the first set, the PPP payload is received in a PPP data packet encapsulated in an inbound data link protocol data packet, such as from a PPP client or customer premises equipment (CPE).

In some of these embodiments, the method includes generating a mapping between a PPP connection identification number and a unique number used as an Ethernet source identification, such as a Media Access Control (MAC) address or a virtual local area network (VLAN) tag. Generating the outbound protocol frame includes generating an outbound Ethernet frame with data that indicates the unique number in an Ethernet source identification field in an Ethernet header of the outbound Ethernet frame.

In some of these embodiments, an inbound Ethernet frame is received with data that indicates the unique number in an Ethernet destination identification field in an Ethernet header of the inbound Ethernet frame. The PPP connection identification number associated with the unique number is determined based on the mapping. A PPP header is generated based in part on the PPP connection identification number. An outbound data link protocol data packet is generated that includes the PPP header. The outbound data link protocol data packet is sent to a destination based on the PPP connection identification number.

In some of these embodiments, routing data is received from the server that uses the PPP control data. The routing data indicates whether a PPP payload that does not include PPP control data should be directed to the server. If it is determined that the PPP payload does not include PPP control data, then an outbound protocol frame is generated with the PPP payload in the outbound protocol payload and without a PPP header in the outbound protocol payload. It is determined whether the PPP payload should be directed to the server based on the routing data. If it is determined that the PPP payload should be directed to the server, then the outbound protocol frame is sent to the server.

In a second set of embodiments, a method includes receiving an inbound frame that uses an inbound protocol that is different from point to point protocol (PPP) and from PPP over Ethernet (PPPoE) and from PPP over Asynchronous Transfer Mode (ATM) protocol (PPPoA). It is determined whether an inbound protocol type field in the inbound frame includes data that indicates PPP control data. If so, then PPP control data in an inbound protocol payload of the inbound frame is used for at least one of authenticating a particular user, provisioning a particular link with the particular user, provisioning a network layer protocol to use the particular link, testing a link performance and establishing a session with the particular user.

In a third set of embodiments, a method at a broadband remote access server manages a persistent session associated with a particular Media Access Control (MAC). It is determined whether an elapsed time since a data packet is received with the particular MAC address exceeds a threshold time. If so, then point-to-point protocol (PPP) control data is sent in a data link protocol payload that is encapsulated in a data packet with an Ethernet destination field that indicates the particular MAC address. The PPP control data indicates a request for an echo. It is determined whether a data packet with the particular MAC address in an Ethernet source field is received within a particular time interval. If not, then a session associated with the particular MAC address is terminated.

In other sets of embodiments, apparati and computer-readable media perform steps of the above methods.

In the following description, embodiments are described primarily in the context of migrating the PPP data plane to IP over Ethernet and the PPP control plane to Ethernet with a new Ethernet type; but the invention is not limited to this context. In some embodiments, the PPP data plane may be migrated to a different protocol than IP over Ethernet and the PPP control plane may be migrated to a different protocol than Ethernet.

2.0 Network Overview

FIG. 1A is a block diagram that illustrates a remote access network 100, according to an embodiment. A computer network is a geographically distributed collection of interconnected sub-networks (e.g., sub-networks 110a, 110b, 110c, 110d collectively referenced hereinafter as sub-networks 110) for transporting data between nodes, such as computers. A local area network (LAN) 110a is an example of such a sub-network. The network's topology is defined by an arrangement of end nodes (e.g., end nodes 120a, 120b, 120c, 120d, collectively referenced hereinafter as end nodes 120) that communicate with one another, typically through one or more intermediate network nodes, such as a router or switch, that facilitates routing data between end nodes 120 on different sub-networks. As used herein, an end node 120 is a node that is configured to originate or terminate communications over the network. In contrast, an intermediate network node facilitates the passage of data between end nodes. Intermediate network nodes depicted in FIG. 1A include customer premises equipment (CPE) 150a, 150b, access modules 152a, 152b, and Broadband Remote Access Server (BRAS) node 154.

Four sub-networks 110 that are typically involved in remote access are depicted in FIG. 1A. Each sub-network 110 may includes zero or more intermediate network nodes. An IP network 110d is the target for remote access by users at a remote site 102.

To access IP network 110d, a LAN 110a is connected to CPE 150a which serves as a bridge to a network 110b built on a telephone wire infrastructure. In an illustrated embodiment, LAN 110a uses Ethernet infrastructure. Although the remote site 102 includes an Ethernet LAN 110a and two end nodes 120a, 120b, in other embodiments more or fewer end nodes 120 are connected to more or fewer or different LANs 110, such as one or more LANs using Asynchronous Transfer Mode (ATM) infrastructure. In some cases CPE is a telephone modem using acoustic signals over a low-bandwidth legacy telephone system. In an illustrated embodiment, CPE 150a is a digital subscriber line (DSL) modem for establishing a high bandwidth DSL connection over the telephone wire network 110b.

In an illustrated embodiment, sub-network 110b is a network built on telephone wire infrastructure. In other embodiments, sub-network 110b is replaced by another network with wide availability for remote sites, such as a network built on coaxial copper or optical cable or a wireless network. In such embodiments, CPE 150a is a cable or optical modem or wireless network interface card for establishing a high bandwidth cable or optical or wireless connection over the sub-network 110b. In an illustrated embodiment, the protocol used for communications over sub-network 110b is ATM encapsulated in DSL (ATM/DSL).

Communications over sub-network 110b from CPE 150a, 150b terminate at access module 152a. Although two CPE 150a, 150b are depicted connected to sub-network 110b, in other embodiments more or fewer CPE are connected to sub-network 110b. In an illustrated embodiment, access module 152a is a DSL Access Module (DSLAM). In other embodiments, access module 152a is a controller for a bank of low-bandwidth modems or a cable or optical access module.

An internet service provider (ISP) typically maintains several access modules 152a, 152b and an access network 110c for connection to the IP network 110d through a Broadband Remote Access Server (BRAS) node 154. In many current embodiments, the access network 110c is based on an ATM infrastructure, and the base communication protocol is ATM.

Figure 1B:
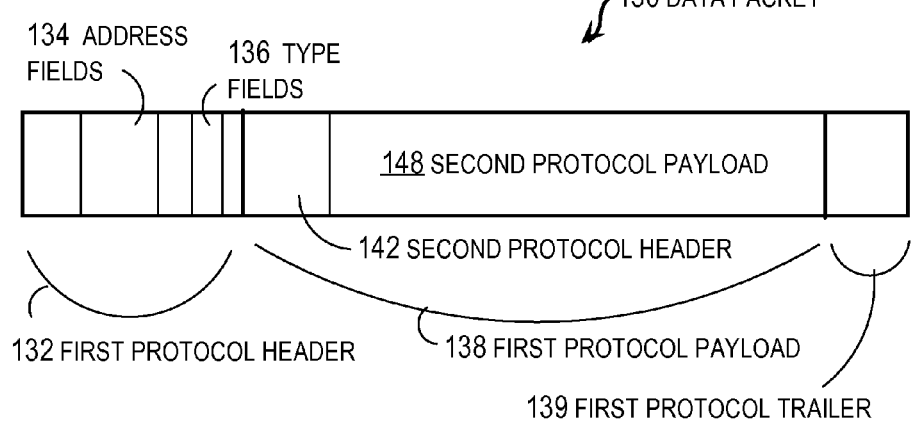
FIG. 1B is a block diagram that illustrates a packet of data communicated over a network.

FIG. 1B is a block diagram that illustrates a generalized data packet 130 communicated over a network, such as network 100. Each packet typically comprises one or more payloads of data, e.g. payloads 138, 148, each encapsulated by at least one network header, e.g., headers 132, 142, respectively. For example, payloads are encapsulated by appending a header before the payload, sometimes called prepending a header, and sometimes by appending a trailer (or tail) after the payload. Each header 132, 142 is formatted in accordance with a network communication protocol; header 132 is formatted according to a first protocol and header 142 is formatted according to a second protocol. The header 142 for the second protocol is included within the payload 138 of the first protocol. As used herein a header for a particular protocol and its payload constitute a data packet for that protocol and may also be called a cell, frame, datagram or message for that protocol. In some publications data packets for different protocols are distinguished in shorthand by using a different one of the above terms for different protocols, e.g., to refer to Ethernet frames and IP datagrams, but here the terms are used interchangeably.

The header for a protocol typically includes type fields that identify the protocol to which the header belongs and the next protocol in the payload, if any. For example, the header 132 for the first protocol includes type fields 136. The header for a protocol often includes a destination address or a source address, or both, for the information in the payload. For example, the header 132 for the first protocol includes address fields 134 where the source and receiver address for the first protocol is located within the packet 130. As described above, a transmitted data packet's network headers include at least a physical link (layer 1) header, a data-link (layer 2) header, and possibly an internetwork (layer 3) header and possibly a transport (layer 4) header.

The physical (layer 1) header defines the electrical, mechanical and procedural mechanisms for proper capture of the Ethernet frame, but is not captured by a Media Access Controller. The layer 1 header may include a DSL or ATM or Ethernet layer 1 header, or some combination.

The data-link header provides information for transmitting the packet over a particular physical link (i.e., a communication medium), such as a point-to-point link, Ethernet layer 2 link, wireless link, optical link, etc. An intermediate network node typically contains multiple physical links with multiple different nodes. To that end, the data-link header may specify a pair of "source" and "destination" network interfaces that are connected by the physical link. A network interface contains the mechanical, electrical and signaling circuitry and logic used to couple a network node to one or more physical links. A network interface is often associated with a hardware-specific address, known as a media access control (MAC) address. Accordingly, the source and destination network interfaces in the data-link header are typically represented as source and destination MAC addresses. The data-link header may also store flow control, frame synchronization and error checking information used to manage data transmissions over the physical link. The PPP protocol and header are described in more detail below.

The internetwork header provides information defining the source and destination address within the computer network. Notably, the path may span multiple physical links. The internetwork header may be formatted according to the Internet Protocol (IP), which specifies IP addresses of both a source and destination node at the end points of the logical path. Thus, the packet may "hop" from node to node along its logical path until it reaches the end node assigned to the destination IP address stored in the packet's internetwork header. After each hop, the source and destination MAC addresses in the packet's data-link header may be updated, as necessary. However, the source and destination IP addresses typically remain unchanged as the packet is transferred from link to link in the network.

The transport header provides information for ensuring that the packet is reliably transmitted from the source node to the destination node. The transport header typically includes, among other things, source and destination port numbers that respectively identify particular software applications executing in the source and destination end nodes. More specifically, the packet is generated in the source node by a software application assigned to the source port number. Then, the packet is forwarded to the destination node and directed to the software application assigned to the destination port number. The transport header also may include error-checking information (e.g., a checksum) and other data-flow control information. For instance, in connection-oriented transport protocols such as the Transmission Control Protocol (TCP), the transport header may store sequencing information that indicates the packet's relative position in a transmitted stream of packets.

As stated above in the background section PPP is a data link layer protocol, specified in IETF RFC 1661. PPP is comprised of three main components: 1] a method for encapsulating multi-protocol datagrams; 2] a Link Control Protocol (LCP) for establishing, configuring, and testing the data-link connection; and 3] a family of Network Control Protocols (NCPs) for establishing and configuring different network-layer protocols. The link will remain configured for communications until explicit LCP or NCP packets close the link down, or until some external event occurs (e.g., an inactivity timer expires or a network administrator intervenes). The PPP data packet includes a PPP header that indicates the protocol in the PPP payload (e.g., an IP datagram or PPP control plane data), a PPP payload, and a PPP trailer.

In the context of a remote access network, like network 100 depicted in FIG. 1A, the PPP control plane is used to establish a persistent communication channel as a series of point-to-point links from an end node at remote site 102 (e.g., end node 120*a*) to the remote access server on the target network (e.g., BRAS node 154 on IP network 110*d*). Procedures for establishing and breaking down this persistent channel are well known in the art and are described in RFC 1661. This channel is then used to transport PPP data plane payloads (e.g., IP datagrams) to the remote access server, which extracts the PPP data plane payload and transmits that payload over the target network.

Figure 1C:
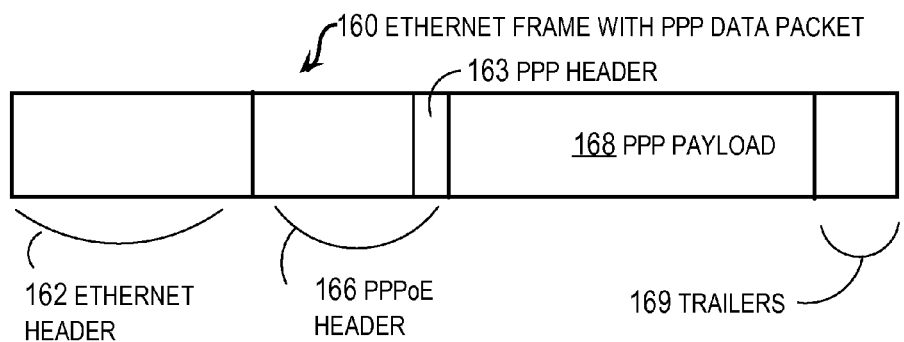
FIG. 1C is a block diagram that illustrates a PPPoE packet of data communicated over a network.

PPP data packets are transmitted over Ethernet according to PPPoE described in IETF RFC 2516. FIG. 1C is a block diagram that illustrates an Ethernet frame with a PPPoE data packet. The Ethernet frame 160 includes an Ethernet header 162 and trailers 169. The trailers 169 include an Ethernet trailer among other trailers. The Ethernet header 162 includes a type field that holds data that indicates a payload with PPPoE. The Ethernet payload includes a PPPoE header 166 and a PPP payload 168 and a PPP trailer. In the illustrated embodiment, the PPP header 163 is included in the PPPoE header 166 and the PPP trailer is included in trailers 169. The PPP payload 168 is thus PPP data plane data or PPP control plane data. A code field in the PPPoE header indicates whether the data packet is involved in discovering a new PPP session or using an existing session. The PPP session, if any, is indicated by data in a Session ID field in the PPPoE header 166. The length of the PPP data packet, including PPP header 163, is indicated by data in a Length field in the PPPoE header.

Figure 1D:
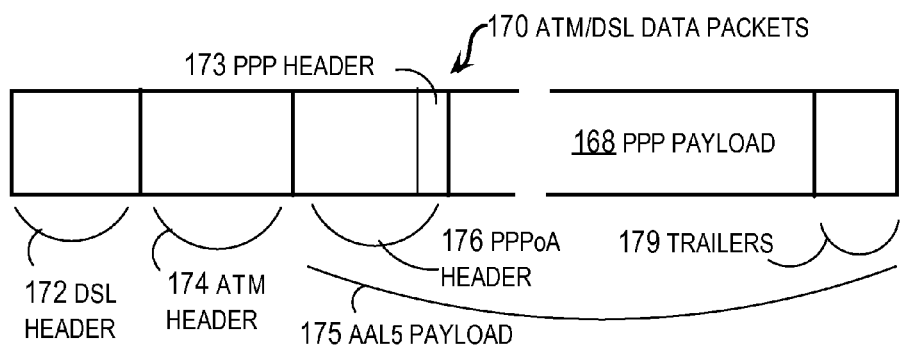
FIG. 1D is a block diagram that illustrates a PPPoA packet of data communicated over a DSL network.

PPP data packets are transmitted over ATM according to PPPoA described in IETF RFC 2364. ATM cells are of fixed small size—53 octets (an octet is 8 binary digits), with a 5-octet ATM header and a 48-octet ATM payload. A protocol that allows for larger data packets to be transmitted over ATM is an ATM Adaptation Layer (AAL), such as AAL5 that fragments a large protocol data packet at a sending node for transmission using multiple ATM cells and reassembles the large protocol data packet at a receiving node. An AAL trailer is aligned with the end of the last ATM cell and includes a length field that holds data that indicates the length of the AAL frame. PPPoA utilizes AAL5. FIG. 1D is a block diagram that illustrates a PPPoA packet of data communicated over a DSL network, such as sub-network 110*b*, in multiple ATM/DSL packets. FIG. 1D depicts the DSL header 172, ATM header 174, and beginning of the AAL5 frame 175 in the first ATM cell, and the end of the AAL5 frame in the last ATM cell.

The beginning of the AAL frame includes the PPPoA header 176 and the start of the PPP payload 168. The end of the AAL frame includes the end of the PPP payload 168 and trailers 179, including any padding to align with the end of the last ATM cell. In the illustrated embodiment, the PPP header 173 is included in the PPPoA header 176 and the PPP trailer is included in trailers 179. The PPP payload 168 is thus PPP data plane data or PPP control plane data. In embodiments that use an ATM virtual connection (VC), the PPPoA header 176 includes only the PPP header 173. In embodiments that use ATM logical link control (LLC), the PPPoA header 176 includes multiple other fields, including a network layer protocol identification (NLPID) field that holds data that indicates PPP.

3.0 Splitting PPP Traffic

As noted in the background section, there is a trend to migrate the access network 110*c* or the telephone wire network 110*b* or the LAN 110*a*, or some combination to Ethernet or IP over Ethernet. An advantage of such a migration is that messages generated at remote site 102 can be propagated to IP network 110*d* with less or no effort devoted to translating or repackaging the messages in various protocols.

As stated above in the background section, if one of the sub-networks, such as the access network 110*c*, is converted to Ethernet, and an upstream sub-network, such as telephone wire network 110*b*, still uses ATM, then a problem arises because ATM can not be used on Ethernet infrastructure.

Thus PPPoA can not be used on the Ethernet sub-network. Translating PPPoA to PPPoE is not desirable for the reasons given above, in the background section.

Even if PPPoE could effectively transmit PPPoA data packets, there are advantages to eliminating the PPPoE layer and placing IP directly over Ethernet. As mentioned above in the background section, one advantage of IP over Ethernet is that IP savvy network devices in the network infrastructure (e.g., in access network 110c or LAN 110a or sub-network 110b) can utilize the IP header in the Ethernet payload to improve network performance. For example, IP savvy network devices can make better routing decisions based on data flows, can filter redundant or malicious traffic, and can implement IP quality of service provisioning as promulgated by an IP policy.

However, as stated above in the background section, it is also desirable to continue to use PPP control plane data to establish, test, maintain and break down a persistent connection and to authenticate a user of that connection.

According to various embodiments of the invention, one or more network devices are adapted to split PPP traffic. PPP control plane data are sent as one type of data link payload and PPP data plane data are sent as a different type of data link payload.

In some illustrated embodiments, PPP data plane messages are translated to IP over Ethernet and PPP control plane messages are translated to Ethernet frames of a new type. The PPP control plane data transmitted as an Ethernet frame is still used to establish, test, authorize, maintain and breakdown connections between an end node at a remote site 102 and a BRAS node 154, but the data plane is transmitted as simple IP over Ethernet, without a PPPoE header 166.

Figure 2A:
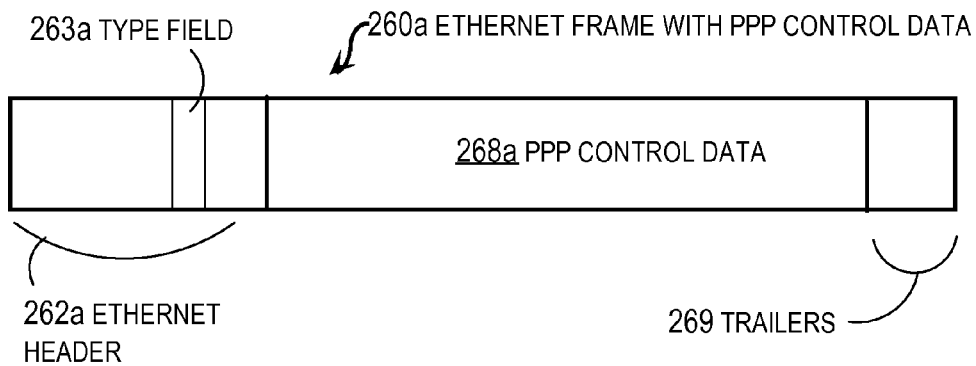
FIG. 2A is a block diagram that illustrates an Ethernet frame carrying PPP control data, according to an embodiment.

FIG. 2A is a block diagram that illustrates an Ethernet frame 260a carrying PPP control data from a PPP payload, according to an embodiment. The Ethernet frame 260a includes an Ethernet header 262a and trailers 269. The type field 263a in the Ethernet header 262a includes data that indicates PPP control data is contained in the Ethernet payload. It is anticipated that a new Ethernet type is defined that carries the meaning that PPP control data is carried in the Ethernet payload. Unlike PPPoE, depicted in FIG. 1C, there is not a complete PPPoE header following the Ethernet header 262a. For example there is not a Session ID field in Ethernet frame 260a. The Ethernet payload includes PPP control data 268a.

Figure 2B:
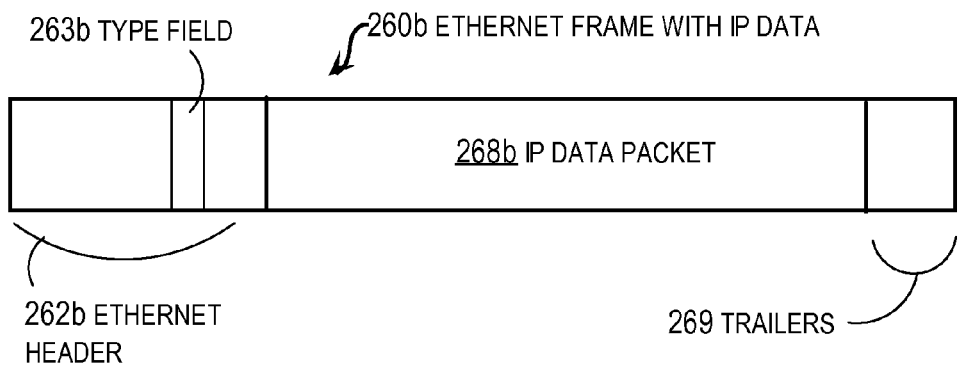
FIG. 2B is a block diagram that illustrates an Ethernet frame carrying an IP datagram from a PPP payload, according to an embodiment.

FIG. 2B is a block diagram that illustrates an Ethernet frame 260b carrying an IP datagram from a PPP payload, according to an embodiment. The Ethernet frame 260b includes an Ethernet header 262b and trailers 269. The type field 263b in the Ethernet header 262b includes data that indicates an IP datagram is contained in the Ethernet payload. The Ethernet payload includes an IP datagram 268b. Unlike PPPoE, depicted in FIG. 1C, there is not a PPPoE header following the Ethernet header 262a. Furthermore, the IP datagram is directly after the Ethernet header 262b so that IP savvy network nodes can utilize the IP header.

As is well known in the art Ethernet frames may be transmitted over ATM infrastructure using an ATM Adaptation Layer; therefore Ethernet frames 260a, 260b may be transmitted over ATM infrastructure, including encapsulation in ATM/DSL packets.

Figure 2C:
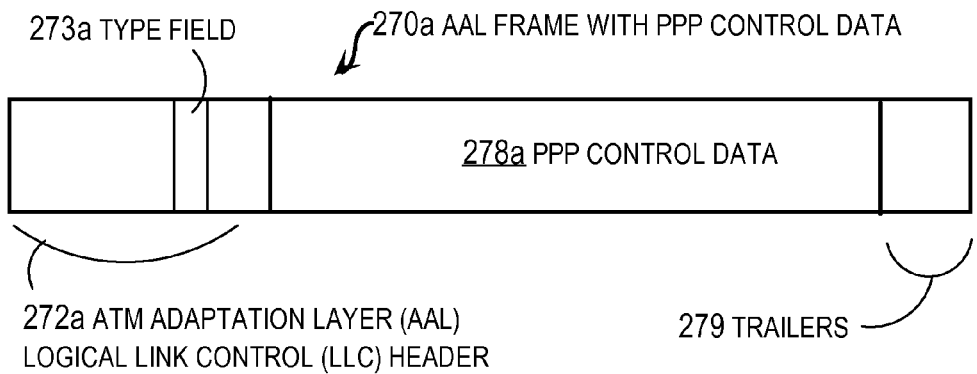
FIG. 2C is a block diagram that illustrates an ATM Adaptation Layer (AAL) data packet carrying PPP control data, according to an embodiment.

In some illustrated embodiments, PPP data plane messages are translated to IP over ATM and PPP control plane messages are translated to ATM frames of a new type, instead of using Ethernet frames. FIG. 2C is a block diagram that illustrates an ATM Adaptation Layer (AAL) Logical Link Control (LLC) data packet carrying PPP control data, according to an embodiment. The AAL frame 270a includes an AAL LLC header 272a and trailers 279. The type field 273a in the header 272a includes data that indicates PPP control data is contained in the AAL payload. It is anticipated that a new AAL LLC payload type is defined that carries the meaning that PPP control data is carried in the AAL LLC payload. Unlike PPPoA, depicted in FIG. 1D, there is not a complete PPPoA 176 in the AAL LLC header 272a. For example there is not a Protocol Identifier field in AAL LLC header 272a. The AAL LLC payload includes PPP control data 278a. In some embodiments, there is not a PPP header 173, either, in AAL LLC header 272a.

Figure 2D:
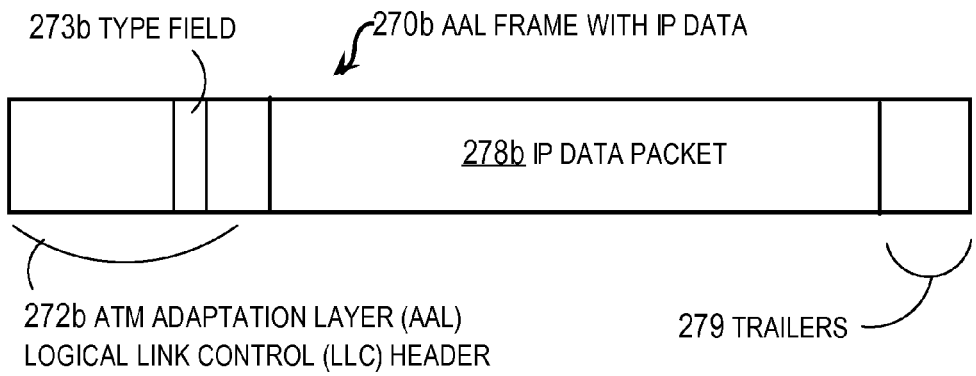
FIG. 2D is a block diagram that illustrates an AAL data packet carrying an IP datagram from a PPP payload, according to an embodiment.

FIG. 2D is a block diagram that illustrates an AAL LLC data packet carrying an IP datagram from a PPP payload, according to an embodiment. The AAL frame 270b includes an AAL LLC header 272b and trailers 279. The type field 273b in the header 272b includes data that indicates an IP datagram is contained in the AAL LLC payload. The payload includes an IP datagram 278b. Unlike PPPoA, depicted in FIG. 1D there is not a PPP header 173 in the AAL LLC frame.

Three embodiments of the invention are described below. In a first illustrated embodiment, PPP traffic is split by a PPP client process in an end node (e.g., end node 120a) at a remote site 102. In a second illustrated embodiment, PPP traffic is split by a PPP agent process running on CPE (e.g., CPE 150a) at the remote site 102. In a third illustrated embodiment, PPP traffic is split at a PPP agent process running on an Access Module (e.g., DSLAM 152a). In each embodiment, a BRAS process running on BRAS node 154 utilizes PPP control data sent in the payload of the new Ethernet or ATM frame. It is assumed for purposes of illustration in the following that LAN 110a uses ATM infrastructure, that telephone wire network 110b uses ATM over DSL, and that access network 110c uses Ethernet infrastructure.

In all three embodiments, PPP is maintained for its more useful functions (e.g., for user authentication and network parameter negotiation) while moving the data plane away from PPPoE or PPPoE and directly to Ethernet for IP traffic. By keeping the PPP control plane intact, network service providers may migrate their data plane to "IP-only," and either keep the PPP control plane indefinitely for its non-IP access and its user-authentication properties, or migrate it separately. This may be attractive for some network service providers given the potential operational costs with respect to retraining for different authentication methods and retrofitting Authentication, Authorization, Accounting (AAA) servers, among other costs.

3.1 Splitting PPP Traffic at a PPP Client

FIG. 3A is a flow diagram that illustrates at a high level a method 300 for splitting PPP traffic at a PPP client, according to an embodiment. Although steps are shown in a particular order in FIG. 3A and subsequent flow diagram for purposes of illustration, in other embodiments one or more steps are performed in a different order or overlap in time or are omitted, or are changed in some combination.

Method 300 involves modifying PPP or PPPoE or PPPoA client software. In step 302, a PPP payload is prepared at the PPP client. For one example, a PPP Active Discovery Initiation (PADI) message is generated to start the process to establish a persistent connection with the BRAS for passing IP datagrams, or a Password Authentication Protocol (PPA) message is generated to request authentication of the user at the PPP client. Such a message would previously have included the hexadecimal code c021 or c023 in the PPP header. For another example, an IP datagram is prepared to be sent over an extant persistent connection identified by session identification designated by the term "SID1." Such a message would previously have included the hexadecimal code 8021 in the PPP header.

In step 310, it is determined whether the PPP payload includes control data or an IP datagram. If the PPP payload includes control data, then control passes to step 320. If the PPP payload includes an IP datagram, then control passes to step 350.

In step 320, an Ethernet frame like frame 260a in FIG. 2A is generated with data that indicates PPP control data in type field 263a and the PPP control data in the Ethernet payload. In another embodiment, during step 320, an AAL5 LLC frame like frame 270a in FIG. 2C is generated with data that indicates PPP control data in type field 273a and the PPP control data in the AAL5 LLC payload.

In step 330, the frame generated in step 320 with PPP control data is sent to the CPE for forwarding to the BRAS. Initial PPP control frames are broadcast (i.e., a broadcast code is carried in the MAC destination address field) for receipt by all BRASs. Subsequent PPP control frames are unicast with the MAC address of a particular BRAS in the MAC destination address field. In an illustrated embodiment, an Ethernet frame like frame 270a is sent over ATM according to an AAL protocol for Ethernet frames, as is well known in the art. In an embodiment in which the LAN 110a is Ethernet, the Ethernet frame is a native protocol for the LAN 110a. In an embodiment in which an AAL5 LLC frame is produced during step 320, the AAL5 LLC frame is a native protocol for the ATM network 110a. As is well known according to PPP, before a PPP session is negotiated with the BRAS, the destination address in the Ethernet frame is the broadcast address. After a session is negotiated with the BRAS the destination address is the unicast address of the BRAS, such as a MAC address for a BRAS network interface over which a broadcast from the PPP client was received. In either case, the CPE 150a serves as a bridge to forward frames from LAN 110a over sub-network 110b.

If it is determined in step 310 that the PPP payload includes an IP datagram, then control passes to step 350. In step 350, an Ethernet frame like frame 260b in FIG. 2B is generated with data that indicates an IP datagram in type field 263a and the IP datagram in the Ethernet payload. In another embodiment, during step 350, an AAL5 LLC frame like frame 270b in FIG. 2D is generated with data that indicates an IP datagram in type field 273a and the IP datagram in the AAL5 LLC payload.

In step 360, the frame generated in step 350 with an IP datagram is sent to the CPE, is bridged to an access module based on the destination MAC address. At the access module, the frame is bridged based on its MAC destination address in some embodiments. In some embodiments, the frame is routed based on its IP datagram, as described in more detail below with reference to access module 152a. In an illustrated embodiment, an Ethernet frame like frame 270b is sent over an ATM or Ethernet LAN as described above for step 330. In an embodiment in which an AAL5 LLC frame is produced during step 350, the AAL5 LLC frame is sent over an ATM network. An IP datagram is generated only after a session is negotiated with the BRAS, therefore the destination address is the unicast address of the BRAS.

Figure 3B:
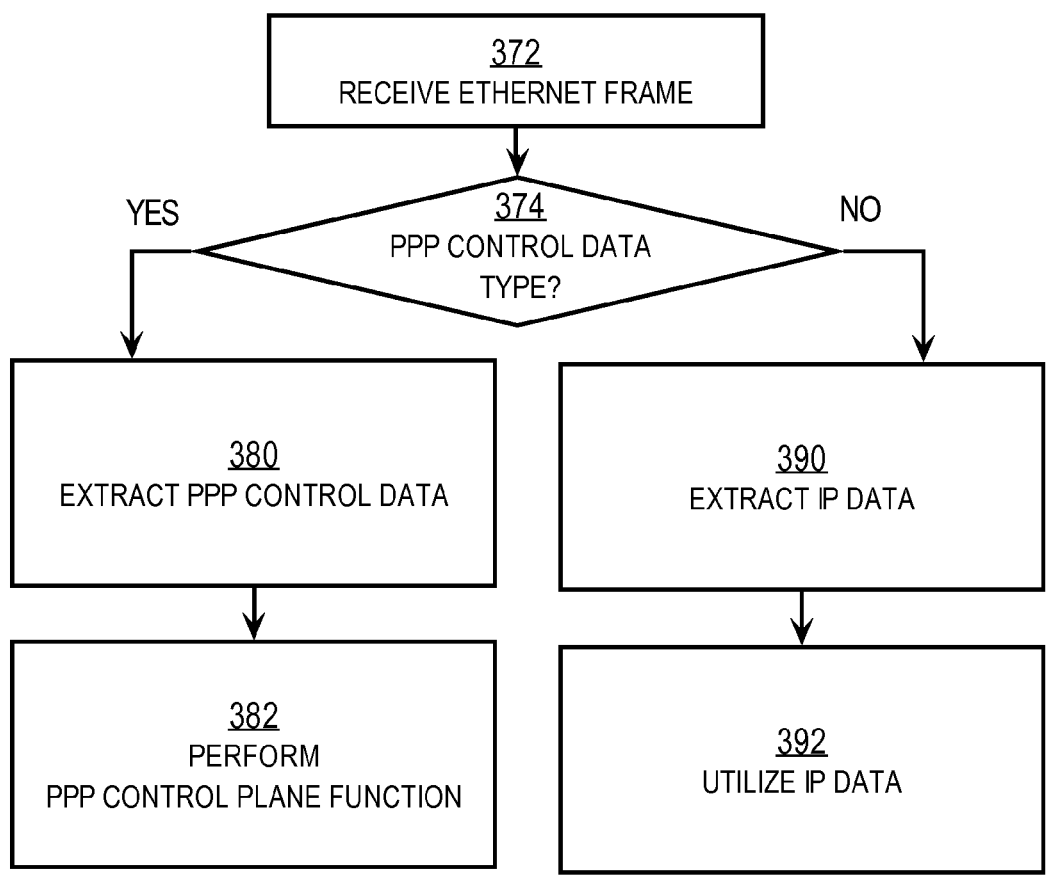
FIG. 3B is a flow diagram that illustrates at a high level a method for receiving PPP split data packets at a PPP client, according to an embodiment.

FIG. 3B is a flow diagram that illustrates at a high level a method 370 for receiving PPP split data packets at a PPP client, according to an embodiment. In step 372 an Ethernet frame is received on the LAN. For example, an Ethernet frame received at the CPE from sub-network 110b is bridged by the CPE to the LAN 110a. In another embodiment, an ATM frame is received on the LAN during step 372.

In step 374, the PPP client determines whether the Ethernet type field indicates PPP control data or an IP datagram. If the Ethernet type indicates PPP control data, control passes to step 380. If the Ethernet type indicates an IP datagram, control passes to step 390. In another embodiment, the PPP client determines whether the AAL LLC type field indicates PPP control data or an IP datagram during step 374.

In step 380, PPP control data is extracted from the Ethernet frame. For example a response to the PPP Active Discovery Initiation (PADI) message, i.e., a PPP Active Discovery Response (PADR) message, is extracted from the received frame, or a Password Authentication Protocol (PPA) response message is extracted from the received frame in response to a PPA request. In another embodiment PPP control data is extracted from AAL LLC frame during step 380.

In step 382, a PPP control plane function is performed based on the PPP control data extracted from the received frame. The response to PPP control data is described in IETF RFC PPP (RFC 1661), cited above.

In step 390, an IP datagram is extracted from the Ethernet frame. For example a server response to an IP request is extracted from the received frame. In another embodiment, an IP datagram is extracted from AAL LLC frame during step 390.

In step 392, the IP datagram is used by the end node, e.g., end node 120a.

FIG. 4A is a flow diagram that illustrates at a high level a method 400 for receiving PPP split traffic at an access module 152a, 152b for an access network 110c, according to an embodiment. In an illustrated example, split PPP traffic from a PPP client is received at a DSLAM access module 152a as Ethernet frames encapsulated in AAL/DSL data packets transmitted over sub-network 110b. In other embodiments, another kind of access module or encapsulation or some combination is used over sub-network 110b. For example, in some embodiments, Ethernet over DSL is used over sub-network 110b and at a DSLAM. In some embodiments, described in more detail below, the split PPP traffic originates in CPE 150a instead of in a PPP client in an end node at remote site 102, such as end node 120a.

In step 410 routing information is received from the BRAS to indicate how the access module should route data packets that include IP datagrams. For example, if IP datagrams from end node 120a are to receive session sensitive treatment, then the routing information indicates that datagrams from that end node are to be routed to BRAS node 154 without regard to the IP address in an IP destination field. In some embodiments, step 410 includes receiving routing information from other network nodes. In some embodiments step 410 is omitted.

In step 420, an Ethernet frame is received. For example, an Ethernet frame such as frame 260a, 260b depicted in FIGS. 2A and 2B is received encapsulated in ATM/DSL. In another embodiment, an ATM frame such as frame 270a, 270b depicted in FIGS. 2C and 2D is received instead of an Ethernet frame.

In step 430, it is determined whether the Ethernet frame is to be routed based on an encapsulated IP datagram. This determination is based on the way the access module is configured, either directly or through propagation of a routing policy from a network administrator. If the Ethernet frame is to be routed based on an encapsulated IP datagram, control passes to step 432. If not, control passes to step 440.

In step 440, the access module performs as an Ethernet bridge by forwarding the Ethernet frame based on the Ethernet destination address. In another embodiment using ATM frames instead of Ethernet frames, if the access network 110c is an ATM network, the access module performs as an ATM bridge during step 440, by forwarding the ATM frame based on an ATM virtual circuit or logical link control (LLC) destination address. In the illustrated example, the access network 110c is an Ethernet network. In this embodiment with an ATM frame arrived over sub-network 110b without an encapsulated Ethernet frame, and an Ethernet access network 110c, the access module translates the ATM frame to an Ethernet frame and forwards the Ethernet frame over the access network 110c. Any method may be used to translate the ATM frame without encapsulated Ethernet to an Ethernet frame.

In step 432, it is determined whether the frame includes an IP datagram. For example, it is determined whether the Ethernet type field holds data that indicates an IP datagram. If not, control passes back to step 440 to perform as an Ethernet bridge. Otherwise, control passes to step 450. In another embodiment it is determined whether an ATM frame holds data that indicates an IP datagram. If not, the access module performs as an ATM bridge or translates an ATM frame to an Ethernet frame, as described above for step 440.

In step 450, the IP datagram is processed based on its IP header and the routing information, if any. For example, certain IP source or destination addresses are filtered out or routed based on the source IP address, destination IP address or routing information, or some combination. If the source IP address is associated with the BRAS based on the routing information received in step 410, the IP datagram is forwarded to the BRAS.

FIG. 4B is a flow diagram that illustrates at a high level a method 460 for receiving PPP split traffic at Broadband Remote Access Server (BRAS) for an IP network, according to an embodiment. In an illustrated example, split PPP traffic from a PPP client in an end node at remote site 102, such as end node 120a, is received at a BRAS node 154. In some embodiments, described in more detail below, the split PPP traffic originates in CPE 150a instead of in a PPP client.

In step 462, an Ethernet frame is received because the access network 110c is an Ethernet network. For example, the BRAS 154 receives an Ethernet frame such as frame 260a, 260b, as depicted in FIG. 2A and FIG. 2B, respectively.

In step 464, it is determined whether the contents of the Ethernet type field indicate PPP control data in the payload or an IP datagram in the payload. If the Ethernet type indicates PPP control data, flow passes to step 470. If the Ethernet type indicates an IP datagram, flow passes to step 490.

In step 470, the PPP control data 268a is extracted from the Ethernet frame 260a. In step 472, a PPP control function is performed based on the PPP control data. The PPP control plane functions are well known in the art and are described in the PPP RFC (RFC 1661), cited above. For one example, a PPP Active Discovery Initiation (PADI) message is extracted and the BRAS sends a response offering configuration data, such as a session identifier (e.g., designated "SID2"). For another example, a Password Authentication Protocol (PPA) message is extracted and the BRAS contacts an Authentication, Authorization Accounting (AAA) server, such as RADIUS, on a node of the IP network 110d, such as end node 120d. The contact with RADIUS is made to determine whether the enclosed password and user ID are to be allowed to establish a session, as is well known in the art.

In step 474, the BRAS generates and sends an Ethernet frame such as frame 260a, with PPP control data in accordance with an response described in the PPP RFC. In some embodiments no response is required, and step 474 is omitted.

In step 476 routing information is sent to the access module associated with the PPP control data received, e.g., DSLAM 152a. For example, if the configuration of a session with a particular client involves special functions by the BRAS, the BRAS will send routing information to the DSLAM indicating IP datagrams with a source IP address equal to the particular IP address of that client should be routed to the BRAS. The BRAS already receives Ethernet frames with PPP control data. This routing information is received by a DSLAM in step 410 and used in step 450, described above. In some embodiments, special routing to the BRAS based on IP source address is not desired, and step 476 is omitted.

In step 490, an IP datagram 268b is extracted from the Ethernet frame 260b. In step 492, the source IP address in the IP datagram is associated with an active session. In some embodiments, the source MAC address in the Ethernet header is associated with an active session. In step 494, session aware features are provided for traffic from that IP source address sent to end nodes on IP network 110d.

3.2 Splitting PPP Traffic at Customer Premises Equipment

Figure 5A:
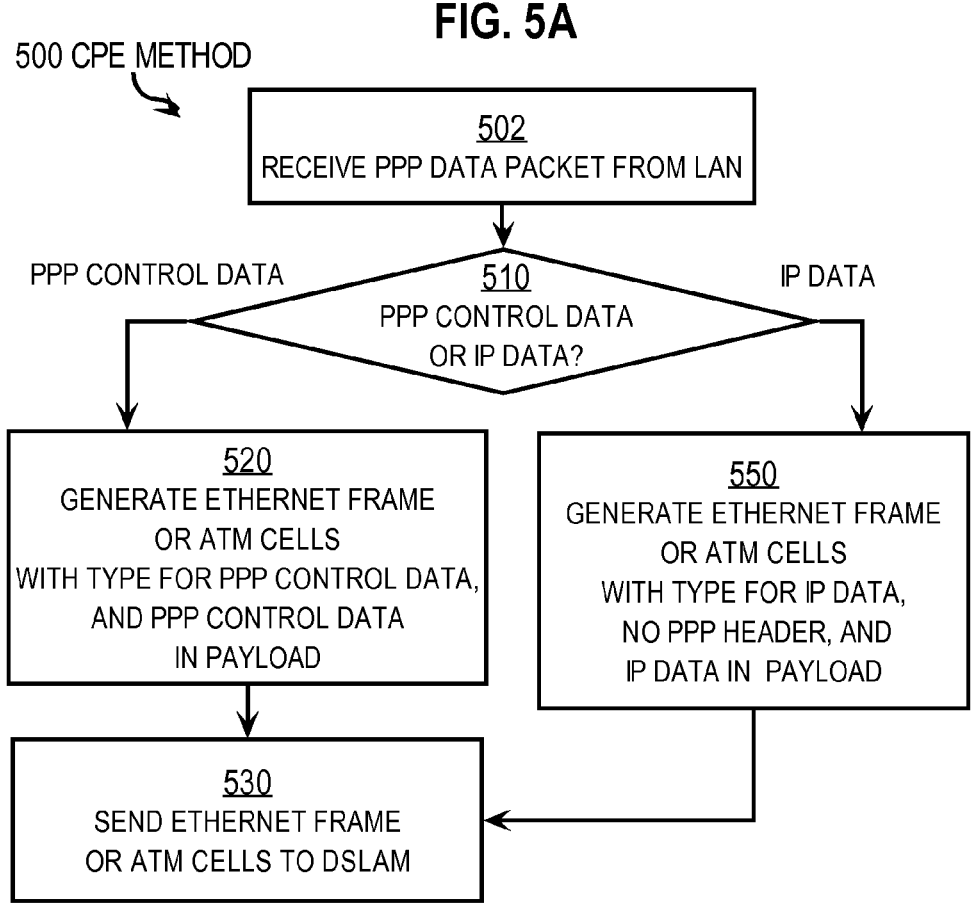
FIG. 5A is a flow diagram that illustrates at a high level a method for splitting PPP traffic at customer premises equipment (CPE), according to an embodiment.

FIG. 5A is a flow diagram that illustrates at a high level a method 500 for splitting PPP traffic at customer premises equipment (CPE), according to an embodiment. In this embodiment, a PPP client performs as is conventional, and the CPE splits PPP traffic before sending it over the telephone wire sub-network 110b. This embodiment involves adding a feature to an intelligent CPE. The most simple DSL CPEs take PPPoE traffic and bridge it over ATM (RFC 1483) up to the DSLAM. New software in the CPE would extract IP packets from the PPPoE flows being sent upstream from the PPP client software to the telephone wire network 110b and bridge them directly as AAL5 IP packets over ATM or IP over Ethernet (which in turn are bridged over AAL5 in some embodiments) depending on the underlying access network equipment and configuration. Packets sent downstream from the access network would consequently arrive as non-PPP encapsulated IP and are encapsulated into PPPoE data packets for sending to the PPP client. This method does not require any modification of PPP client software, but does involve special processing within the CPE. As for the personal computer PPP Client Software model, the BRAS would identify sessions via source IP address. In some embodiments, the BRAS also allows conventional PPP traffic for backwards compatibility.

In step 502, the CPE 150a receives a PPP data packet from the LAN 110a. For example, CPE 150a receives a series of ATM cells that transmit an AAL5 payload similar to AAL5 payload 175 depicted in FIG. 1D. These ATM cells are native to an ATM network and do not involve DSL header 172 or DSL trailers. The AAL5 payload includes a PPPoA 176 header and a PPP payload 168.

In step 510, it is determined whether the PPP payload 168 includes control data or an IP datagram. For example, the PPP header 173 in the PPPoA header 176 is used to determine the protocol of the PPP payload 168. If it is determined that the PPP payload holds PPP control data, flow passes to step 520. If it is determined that the PPP payload holds an IP datagram, flow passes to step 550.

In step 520, in some embodiments, the CPE generates an Ethernet frame like frame 260a in FIG. 2A with data that indicates PPP control data in type field 263a and the PPP control data in the Ethernet payload. In some embodiments, during step 520, an AAL5 LLC frame like frame 270a in FIG. 2C is generated with data that indicates PPP control data in type field 273a and the PPP control data in the AAL5 LLC payload.

In step 530, the Ethernet or ATM frame, e.g., the frame generated in step 320 with PPP control data, is sent to the access module, such as DSLAM 152a. In an illustrated embodiment, an Ethernet frame like frame 270a is encapsulated in ATM according to the AAL protocol for Ethernet frames, and the ATM cells are encapsulated in DSL for transmission to the DSLAM. At the DSLAM 152a, the frames are forwarded as described above for method 400 with reference to FIG. 4A, as appropriate.

If it is determined in step 510 that the PPP payload holds an IP datagram, flow passes to step 550. In step 550, in some embodiments, an Ethernet frame like frame 260b in FIG. 2B is generated with data that indicates an IP datagram in type field 263a and with the IP datagram itself in the Ethernet payload. In some embodiments, during step 550, an AAL5 LLC frame like frame 270b in FIG. 2D is generated with data that indicates an IP datagram in type field 273a and with the IP datagram itself in the AAL5 LLC payload. Control then passes to step 530 to transmit the frame over the telephone wire network 110b to the DSLAM, as described above.

Figure 5B:
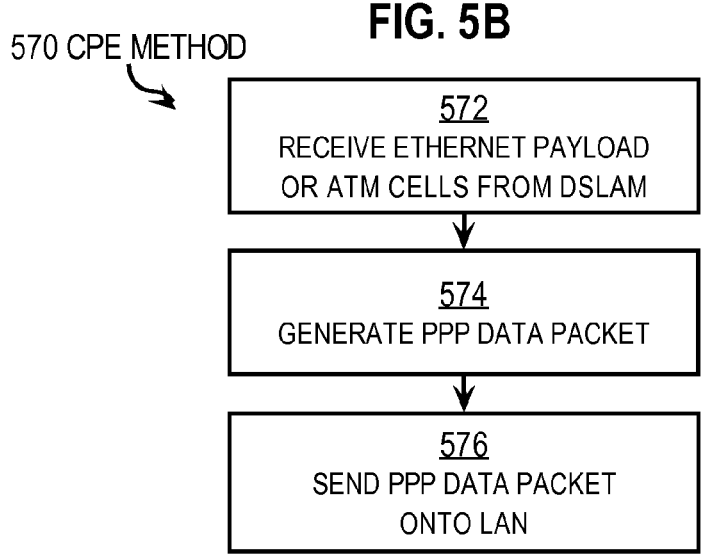
FIG. 5B is a flow diagram that illustrates at a high level a method for receiving PPP split data packets at a CPE, according to an embodiment.

FIG. 5B is a flow diagram that illustrates at a high level a method 570 for receiving PPP split traffic at a CPE, according to an embodiment.

In step 572, in some embodiments, the CPE receives from the DSLAM over the telephone wire network 110b, an Ethernet frame like 260a, 260b encapsulated in ATM/DSL. In some embodiments, the CPE receives from the DSLAM over the telephone wire network 110b, an AAL5 LLC frame like 270a, 270b encapsulated in DSL.

In step 574, the CPE generates a PPP data packet, moving the Ethernet or AAL5 frame payload to the PPP payload. The CPE specifies the payload protocol type in the PPP header, based on the type field in the received frame (e.g., 263a, 263b, 273a or 273b).

In step 576, the PPP data packet is sent onto the LAN 110a for receipt by the appropriate end node, e.g., end node 120a. In the illustrated embodiment, the LAN 110a is an ATM network; and the PPP data packet is sent as a PPPoA frame (as seen in FIG. 1D above the DSL header 172), but without the DSL encapsulation. In some embodiments, the LAN 110a is an Ethernet network; and the PPP data packet is sent as a PPPoE frame (like frame 160 in FIG. 1C).

The PPP client on the end node, e.g., end node 120a, receives the PPP data packet and responds as specified in the PPP RFC (RFC 1661).

3.3 Splitting PPP Traffic at an Access Module

FIG. 6A is a flow diagram that illustrates at a high level a method 600 for splitting PPP traffic at an access network access module, such as a DSLAM, according to an embodiment. The PPP traffic to be split arrives at the DSLAM 132a from the PPP client at the remote site 102 in the conventional manner.

In step 601, the DSLAM receives routing information, as described above in step 410 with reference to FIG. 4A. The routing information is received from the BRAS to indicate how the access module should route data packets that include IP datagrams.

In step 602, the DSLAM receives a PPP data packet. For example, the DSLAM 152a receives a PPPoA data packet as an AAL5 payload transmitted over a series of ATM/DSL data packets, as depicted in FIG. 1D, on a particular ATM virtual circuit.

In step 610, in the illustrated embodiment, the DSLAM generates a unique virtual MAC (vMAC) address for each unique virtual circuit. In some embodiments, in which PPPoE is transported over ATM/DSL or directly over DSL, the DSLAM generates a vMAC address for each unique PPPoE Session ID. The DSLAM associates each vMAC with its corresponding virtual circuit (VC) or Session ID, and the actual MAC or IP address of the end node at the remote site, in a mapping. Each vMAC at the DSLAM becomes an identifier to the network (including the BRAS) for each PPPoA VC or PPPoE session arriving from the PPP client to the DSLAM. In other embodiments a different Ethernet construct for identifying a source is used instead of a MAC address. For example, an Ethernet header can be extended to include a field for a virtual local area network (VLAN) tag. Thus, in some embodiments, a unique virtual VLAN tag (vVLAN) is generated for each unique Session ID or VC; and the mapping associates the vVLAN with the Session ID or VC.

For PPPoA, a simple VC to vMAC mapping in the DSLAM is sufficient. No participation in the PPP or PPPoE state machines need be involved. In this sense, the split of PPP traffic and mapping of vMAC to VC provides legacy support for PPPoA without having to translate PPPoA to PPPoE and suffer the disadvantages of that process, described in the background section.

For PPPoE sessions, the DSLAM responds to the clients with PPP Active Discovery (PAD) messages. Ultimately, only PPP Control packets leave the DSLAM, transmitted to the BRAS with an Ethernet type that indicates PPP control data.

In step 612, it is determined whether the PPP payload includes PPP control data or an IP datagram. If it is determined that the PPP payload includes PPP control data, flow passes to step 620. If it is determined that the PPP payload includes an IP datagram, flow passes to step 640.

In step 620, it is determined whether the PPP data packet encapsulated in PPPoE involves PPP Active Discovery. If so, control passes to step 622 to respond to PAD messages as specified by the PPP RFC (RFC 1661). During this exchange, a PPP Session ID is determined and the DSLAM associates the session ID with a vMAC. To avoid collisions, at the BRAS, a vMAC value is assigned that has not been used recently.

If it is determined in step 620 that the PPP data packet does not involve PPP Active Discovery in PPPoE, then control passes to step 630. In step 630, an Ethernet frame is generated with the vMAC as the source address and data that indicates PPP control data in the Ethernet type field and the PPP control data in the Ethernet payload, like Ethernet frame 260a depicted in FIG. 2A.

In step 632, the Ethernet frame generated in step 630 is sent to the BRAS over an Ethernet access network 110c. The BRAS responds according to method 460 described above with reference to FIG. 4B. Similar to a PPPoE discovery packet, the DSLAM may send the first PPP packet (LCP Configuration Request) as a broadcast.

After PPP authentication and PPP IP Control Protocol (IPCP) negotiation, whereby an end node is configured for IP communications, the client and BRAS are ready to send IP data. Both have IP addresses. Traffic to and from the client and DSLAM is sent as always, using PPPoA in the illustrated embodiment, and PPPoE in some other embodiments. However, IP traffic between the DSLAM and BRAS is sent directly over Ethernet (with the standard indication of IP datagrams in the Ethernet type field) and using the vMAC defined for each PPP session in the Ethernet source or destination address field, as appropriate.

Thus, if it is determined in step 612 that the PPP payload includes an IP datagram, flow passes to step 640. In step 640, an Ethernet frame is generated with the vMAC as the source address and data that indicates an IP datagram in the Ethernet type field and the IP datagram in the Ethernet payload, like Ethernet frame 260b depicted in FIG. 2B.

In step 642, it is determined whether the frame is to be processed (e.g., filtered or routed) based on its IP addresses. In the illustrated embodiments, this determination is a configuration choice based on a network policy, rather than a run-time decision. If the frame is not processed based on the IP datagram, then control passes to step 644. In step 644, the frame is bridged according to the MAC address in its Ethernet header. If the frame is processed based on the IP datagram, then control passes to step 648. In step 648, the Ethernet frame is routed according to the IP protocol and the routing information received in step 601. Thus, IP datagrams from a source IP address identified by the BRAS as utilizing a session aware feature may be routed through the BRAS.

Figure 6B:
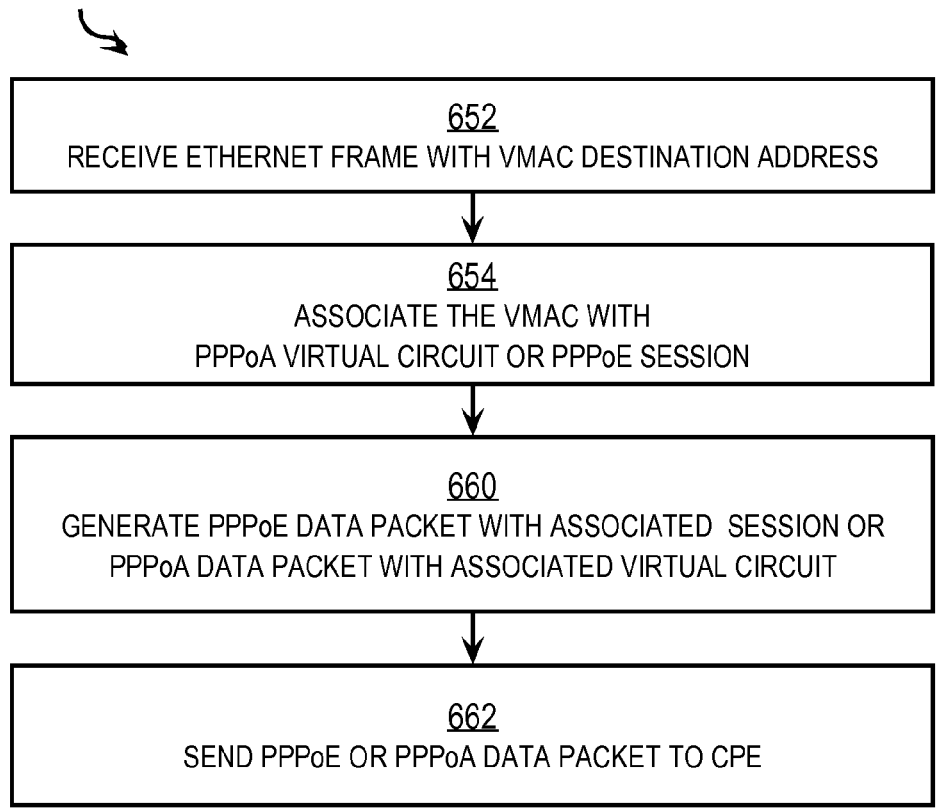
FIG. 6B is a flow diagram that illustrates at a high level a method for receiving PPP split data packets at an access module, such as a DSLAM, according to an embodiment.

FIG. 6B is a flow diagram that illustrates at a high level a method 650 for receiving PPP split traffic at an access module, such as a DSLAM, according to an embodiment.

In step 652, the DS LAM 152a receives over the access network 110c, an Ethernet frame like 260a, 260b. In step 654, the DSLAM extracts the vMAC value from the destination MAC address and associates the vMAC with a PPPoE session ID value or a PPPoA VC value.

In step 660, the DSLAM generates a PPP data packet, moving the Ethernet frame payload to the PPP payload. The DSLAM specifies the payload protocol type in the PPP header, based on the type field in the received frame (e.g., 263a, 263b, 273a or 273b). In the illustrated embodiment, using ATM infrastructure between the DSLAM and an end node (e.g., 120a) at the remote site 102, a PPPoA data packet is constructed from the PPP data packet. and sent over the VC associated with the extracted vMAC in step 652. The CPE 150a serves as an ATM bridge to the end node (e.g., end node 120a) at remote site 102.

In other embodiments, using Ethernet infrastructure between the DSLAM and an end node (e.g., 120a) at the remote site 102, a PPPoE data packet is constructed from the PPP data packet. The Session ID field in the PPPoE is filled with the session ID value associated with the vMAC in step 652, and the destination address field in the Ethernet header is filled with the actual MAC address also associated with the vMAC.

In step 662, the PPP data packet is sent on to the CPE for delivery to the PPP client on an end node at the remote site 102. In the illustrated embodiment, using ATM infrastructure, the PPPoA data packet constructed in step 660 is sent over the VC associated with the extracted vMAC in step 652. The CPE 150a serves as an ATM bridge to the end node (e.g., end node 120a) at remote site 102. In other embodiments using Ethernet infrastructure, the generated PPPoE packet, like Ethernet frame 160 in FIG. 1C, is sent over the sub-network 110b. The CPE serves as an Ethernet bridge to the end node (e.g., end node 120a) at remote site 102.

The PPP client on the end node, e.g., end node 120a, receives the PPP data packet and responds as specified in the PPP RFC (RFC 1661).

The network may be made aware of the vMAC to IP address mapping via an unsolicited Address Resolution Protocol (ARP) message sent over the network by the BRAS or DSLAM. ARP is an Internet protocol well known in the art for mapping an IP address to a MAC address and is defined in IETF RFC 826, the entire contents of which are hereby incorporated by reference as if fully set forth herein. In some embodiments (depending on the services being offered), the DSLAM routes packets directly from the DSLAM.

In some embodiments, the access network 110c and the target IP network 110d merge, with multiple paths connecting them outside the BRAS. In such embodiments in which the BRAS is offering a specialized service requiring knowledge of the mapping between the authenticated user, the PPP session, the DSLAM vMAC, and policy on the BRAS, the traffic from the end nodes on the remote site which subscribe to the specialized service is preferably routed through the BRAS. Examples of such specialized services include a virtual firewall and access to a Multi-protocol Label Switching (MPLS) virtual private network (VPN), among others. In other embodiments, the traffic from end nodes at the remote site may simply be routed from the DSLAM. Techniques using standard ARP and IP routing can be used to ensure that traffic flows through the BRAS if desired.

At the BRAS, PPP control traffic split off by the DSLAM can always be identified by the session vMAC. IP data traffic for a given session may either be identified by the session vMAC, or via source IP address by creation of an "IP Session." PPP control packets arriving over an unknown vMAC source address indicate arrival of a new PPP session. PPP is negotiated in the normal way, sending PPP control data directly over Ethernet using the vMAC for each session to the DSLAM and the MAC address of the BRAS.

An advantage of these methods is that, by sending all data packets over Ethernet directly, the 1500 byte MTU is preserved for PPPoA clients. PPP Control Protocol traffic, which technically may be 1500 bytes, is limited to 1498 bytes. In practice, PPP Control Protocol traffic does not reach 1500 bytes unless it is padded (and such padding may be ignored).

Unless provided by PPP, the BRAS may not receive active notification that a session has gone down at the DSLAM (e.g., if a line is cut or deprovisioned). In some embodiments, the BRAS is configured to send an LCP echo if traffic is not received from a given MAC address (e.g., a DSLAM generated vMAC address) for some time. If the LCP echo times out, access to the MAC is cleaned up. To avoid collision, the DSLAM does not immediately reuse a vMAC for a given VC after reprovisioning.

Figure 7:
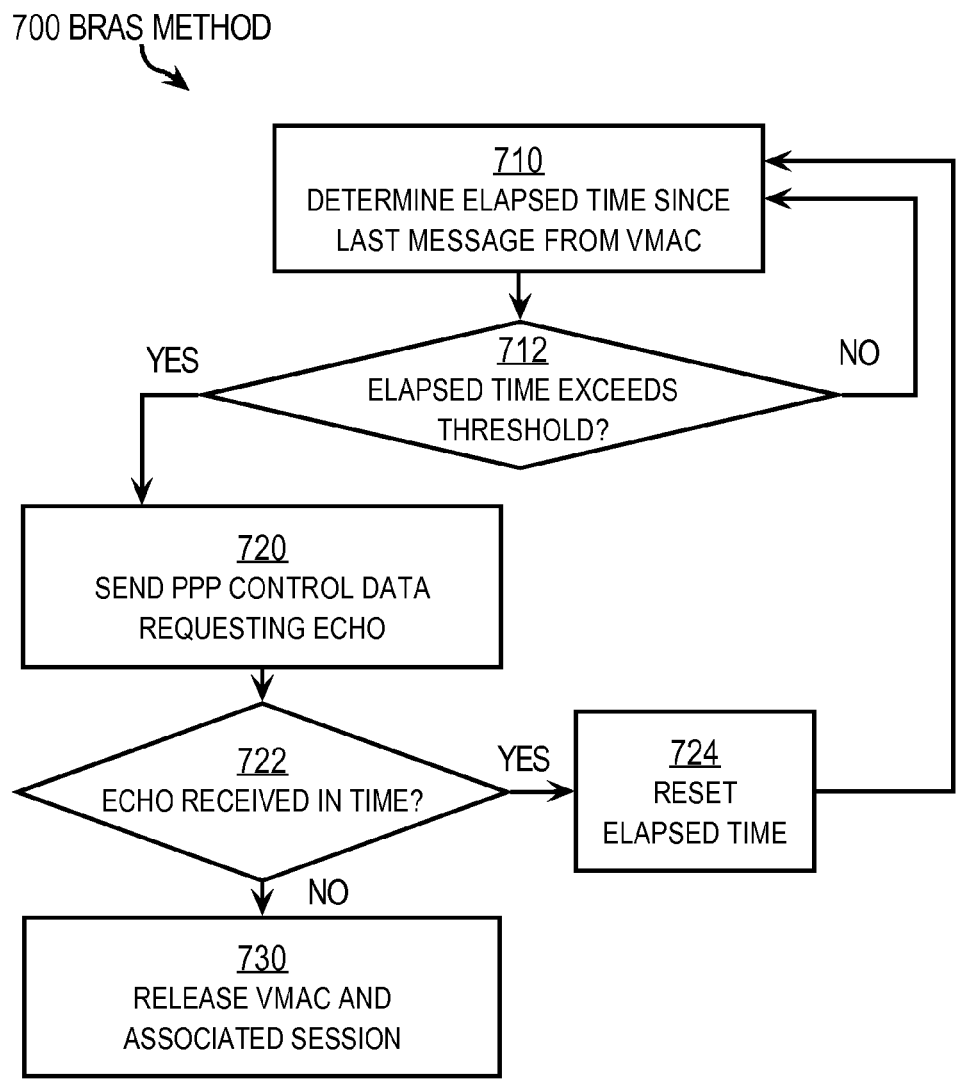
FIG. 7 is a flow diagram that illustrates at a high level a method for ending a PPP session at a BRAS when PPP traffic is split at an access module, such as at a DSLAM, according to an embodiment.

FIG. 7 is a flow diagram that illustrates at a high level a method 700 for ending a PPP session at a BRAS when PPP traffic is split at an access module, such as a DSLAM, according to an embodiment.

In step 710, an elapsed time since receipt of the last message from a given MAC (e.g. vMAC) is determined. In step 712, it is determined whether the elapsed time exceeds a threshold value, e.g., ten minutes. If not, control passes back to step 710. If it is determined that the elapsed time since the last message from a given vMAC exceeds the threshold, then control passes to step 720.

In step 720, PPP control data is sent in an Ethernet packet to the DSLAM associated with the vMAC, requesting an echo. In step 722, it is determined whether the echo is received at the BRAS within a certain time window. If so, then the session is still active. Therefore the elapsed time is reset to zero in step 724 and control passes back to step 710 to determine the elapsed time.

If it is determined that the echo is not received at the BRAS within the certain time window, then the session is presumed ended and control passes to step 730. In step 730, the vMAC and the associated session are terminated and network resources reserved for them are released.

There are advantages to splitting PPP traffic at the access module, such as a DSLAM, rather than at the PPP client or CPE. The change may be made more quickly, more cheaply and more reliably at the access module because there are fewer access modules than there are CPE and PPP clients. Also the access modules are under the direct control of the ISP, while the PPP clients and CPE are distant and under the control of the remote users. For example, disposal of remote PPP client hosts and CPE might not be reported to the ISP. Furthermore, communication with the remote CPE and PPP clients is not controlled by the ISP but is at the discretion of the remote user, so it is difficult to ensure that all CPE and PPP clients have been checked and modified.

4.0 Implementation Mechanisms—Hardware Overview

FIG. 8 is a block diagram that illustrates a computer system 800 upon which an embodiment of the invention may be implemented. The preferred embodiment is implemented using one or more computer programs running on a network node such as a router device. Thus, in this embodiment, the computer system 800 is a network node.

Computer system 800 includes a communication mechanism such as a bus 810 for passing information between other internal and external components of the computer system 800. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). A sequence of binary digits constitutes digital data that is used to represent a number or code for a character. A bus 810 includes many parallel conductors of information so that information is transferred quickly among devices coupled to the bus 810. One or more processors 802 for processing information are coupled with the bus 810. A processor 802 performs a set of operations on information. The set of operations include bringing information in from the bus 810 and placing information on the bus 810. The set of operations also typically include comparing two or more units of information, shifting positions of units of information, and combining two or more units of information, such as by addition or multiplication. A sequence of operations to be executed by the processor 802 constitute computer instructions.

Computer system 800 also includes a memory 804 coupled to bus 810. The memory 804, such as a random access memory (RAM) or other dynamic storage device, stores information including computer instructions. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of computer instructions. The computer system 800 also includes a read only memory (ROM) 806 or other static storage device coupled to the bus 810 for storing static information, including instructions, that is not changed by the computer system 800. Also coupled to bus 810 is a non-volatile (persistent) storage device 808, such as a magnetic disk or optical disk, for storing information, including instructions, that persists even when the computer system 800 is turned off or otherwise loses power.

The term computer-readable medium is used herein to refer to any medium that participates in providing information to processor 802, including instructions for execution. Such a medium may take many forms, including, but not limited to, non-volatile media, volatile media and transmission media. Non-volatile media include, for example, optical or magnetic disks, such as storage device 808. Volatile media include, for example, dynamic memory 804. Transmission media include, for example, coaxial cables, copper wire, fiber optic cables, and waves that travel through space without wires or cables, such as acoustic waves and electromagnetic waves, including radio, optical and infrared waves. Signals that are transmitted over transmission media are herein called carrier waves.

Common forms of computer-readable media include, for example, a floppy disk, a flexible disk, a hard disk, a magnetic tape or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read.

Information, including instructions, is provided to the bus 810 for use by the processor from an external terminal 812, such as a terminal with a keyboard containing alphanumeric keys operated by a human user, or a sensor. A sensor detects conditions in its vicinity and transforms those detections into signals compatible with the signals used to represent information in computer system 800. Other external components of terminal 812 coupled to bus 810, used primarily for interacting with humans, include a display device, such as a cathode ray tube (CRT) or a liquid crystal display (LCD) or a plasma screen, for presenting images, and a pointing device, such as a mouse or a trackball or cursor direction keys, for controlling a position of a small cursor image presented on the display and issuing commands associated with graphical elements presented on the display of terminal 812. In some embodiments, terminal 812 is omitted.

Computer system 800 also includes one or more instances of a communications interface 870 coupled to bus 810. Communication interface 870 provides a two-way communication coupling to a variety of external devices that operate with their own processors, such as printers, scanners, external disks, and terminal 812. Firmware or software running in the computer system 800 provides a terminal interface or character-based command interface so that external commands can be given to the computer system. For example, communication interface 870 may be a parallel port or a serial port such as an RS-232 or RS-422 interface, or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. Wireless links may also be implemented. For wireless links, the communications interface 870 sends and receives electrical, acoustic or electromagnetic signals, including infrared and optical signals, which carry information streams, such as digital data. Such signals are examples of carrier waves.

In the illustrated embodiment, special purpose hardware, such as an application specific integrated circuit (IC) 820, is coupled to bus 810. The special purpose hardware is configured to perform operations not performed by processor 802 quickly enough for special purposes. Examples of application specific ICs include graphics accelerator cards for generating images for display, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

In the illustrated computer used as a router, the computer system 800 includes switching system 830 as special purpose hardware for switching information for flow over a network. Switching system 830 typically includes multiple communications interfaces, such as communications interface 870, for coupling to multiple other devices. In general, each coupling is with a network link 832 that is connected to another device in or attached to a network, such as local network 880 in the illustrated embodiment, to which a variety of external devices with their own processors are connected. In some embodiments an input interface or an output interface or both are linked to each of one or more external network elements. Although three network links 832a, 832b, 832c are included in network links 832 in the illustrated embodiment, in other embodiments, more or fewer links are connected to switching system 830. Network links 832 typically provides information communication through one or more networks to other devices that use or process the information. For example, network link 832b may provide a connection through local network 880 to a host computer 882 or to equipment 884 operated by an Internet Service Provider (ISP). ISP equipment 884 in turn provides data communication services through the public, world-wide packet-switching communication network of networks now commonly referred to as the Internet 890. A computer called a server 892 connected to the Internet provides a service in response to information received over the Internet. For example, server 892 provides routing information for use with switching system 830.

The switching system 830 includes logic and circuitry configured to perform switching functions associated with passing information among elements of network 880, including passing information received along one network link, e.g. 832a, as output on the same or different network link, e.g., 832c. The switching system 830 switches information traffic arriving on an input interface to an output interface according to pre-determined protocols and conventions that are well known. In some embodiments, switching system 830 includes its own processor and memory to perform some of the switching functions in software. In some embodiments, switching system 830 relies on processor 802, memory 804, ROM 806, storage 808, or some combination, to perform one or more switching functions in software. For example, switching system 830, in cooperation with processor 804 implementing a particular protocol, can determine a destination of a packet of data arriving on input interface on link 832a and send it to the correct destination using output interface on link 832c. The destinations may include host 882, server 892, other terminal devices connected to local network 880 or Internet 890, or other routing and switching devices in local network 880 or Internet 890.

The invention is related to the use of computer system 800 for implementing the techniques described herein. According to one embodiment of the invention, those techniques are performed by computer system 800 in response to processor 802 executing one or more sequences of one or more instructions contained in memory 804. Such instructions, also called software and program code, may be read into memory 804 from another computer-readable medium such as storage device 808. Execution of the sequences of instructions contained in memory 804 causes processor 802 to perform the method steps described herein. In alternative embodiments, hardware, such as application specific integrated circuit 820 and circuits in switching system 830, may be used in place of or in combination with software to implement the invention. Thus, embodiments of the invention are not limited to any specific combination of hardware and software.

The signals transmitted over network link 832 and other networks through communications interfaces such as interface 870, which carry information to and from computer system 800, are exemplary forms of carrier waves. Computer system 800 can send and receive information, including program code, through the networks 880, 890 among others, through network links 832 and communications interfaces such as interface 870. In an example using the Internet 890, a server 892 transmits program code for a particular application, requested by a message sent from computer 800, through Internet 890, ISP equipment 884, local network 880 and network link 832b through communications interface in switching system 830. The received code may be executed by processor 802 or switching system 830 as it is received, or may be stored in storage device 808 or other non-volatile storage for later execution, or both. In this manner, computer system 800 may obtain application program code in the form of a carrier wave.

Various forms of computer readable media may be involved in carrying one or more sequence of instructions or data or both to processor 802 for execution. For example, instructions and data may initially be carried on a magnetic disk of a remote computer such as host 882. The remote computer loads the instructions and data into its dynamic memory and sends the instructions and data over a telephone line using a modem. A modem local to the computer system 800 receives the instructions and data on a telephone line and uses an infra-red transmitter to convert the instructions and data to an infra-red signal, a carrier wave serving as the network link 832b. An infrared detector serving as communications interface in switching system 830 receives the instructions and data carried in the infrared signal and places information representing the instructions and data onto bus 810. Bus 810 carries the information to memory 804 from which processor 802 retrieves and executes the instructions using some of the data sent with the instructions. The instructions and data received in memory 804 may optionally be stored on storage device 808, either before or after execution by the processor 802 or switching system 830.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method, comprising:

receiving a particular inbound data packet of a first data link protocol, the particular inbound packet including particular header data and a payload of the first data link protocol, wherein the payload of the first data link protocol contains point-to-point protocol (PPP) data plane data from particular PPP data traffic, the particular header data including an identification of a particular media access control (MAC) address;

receiving another inbound data packet of a second data link protocol different from the data packet of the first data link protocol, the other inbound packet including other header data and a payload of the second data link protocol, the other header data including an identification of the particular MAC address, wherein the payload of the second data link protocol contains particular PPP control plane data from the particular PPP data traffic, wherein the particular and other inbound data packets were generated by splitting the PPP data traffic;

determining that an elapsed time since a latter of the particular and other inbound data packets was received exceeds a threshold time;

sending other PPP control data in a particular data link protocol payload that is encapsulated in an outbound data packet with an Ethernet destination field that indicates the particular MAC address, wherein the other PPP control data indicates a request for an echo; and determining that a data packet with the particular MAC address in an Ethernet source field is received within a particular time interval, wherein receiving the data packet within the particular time interval is used as a basis for presuming that a persistent session is active and prompts a new time window to be initiated for determining whether the persistent session continues to be active.

2. An apparatus, comprising:

a network interface that is coupled to a network for communicating one or more packet flows therewith;

one or more processors; and one or more stored sequences of instructions which, when executed by the one or more processors, causes the one or more processors to carry out the steps of:

receiving a particular inbound data packet of a first data link protocol, the particular inbound packet including particular header data and a payload of the first data link protocol, wherein the payload of the first data link protocol contains point-to-point protocol (PPP) data plane data from particular PPP data traffic, the particular header data including an identification of a particular media access control (MAC) address;

receiving another inbound data packet of a second data link protocol different from the data packet of the first data link protocol, the other inbound packet including other header data and a payload of the second data link protocol, the other header data including an identification of the particular MAC address, wherein the payload of the second data link protocol contains particular PPP control plane data from the particular PPP data traffic, wherein the particular and other inbound data packets were generated by splitting the PPP data traffic;

determining that an elapsed time since a latter of the particular and other inbound data packets was received exceeds a threshold time;

sending other PPP control data in a particular data link protocol payload that is encapsulated in an outbound data packet with an Ethernet destination field that indicates the particular MAC address, wherein the other PPP control data indicates a request for an echo; and determining that a data packet with the particular MAC address in an Ethernet source field is received within a particular time interval, wherein receiving the data packet within the particular time interval is used as a basis for presuming that a persistent session is active and prompts a new time window to be initiated for determining whether the persistent session continues to be active.

3. A computer readable non-transitory medium including sequences of instructions such that when executed are configured for:

receiving a particular inbound data packet of a first data link protocol, the particular inbound packet including particular header data and a payload of the first data link protocol, wherein the payload of the first data link protocol contains point-to-point protocol (PPP) data plane data from particular PPP data traffic, the particular header data including an identification of a particular media access control (MAC) address;

receiving another inbound data packet of a second data link protocol different from the data packet of the first data link protocol, the other inbound packet including other header data and a payload of the second data link protocol, the other header data including an identification of the particular MAC address, wherein the payload of the second data link protocol contains particular PPP control plane data from the particular PPP data traffic, wherein the particular and other inbound data packets were generated by splitting the PPP data traffic;

determining that an elapsed time since a latter of the particular and other inbound data packets was received exceeds a threshold time;

sending other PPP control data in a particular data link protocol payload that is encapsulated in an outbound data packet with an Ethernet destination field that indicates the particular MAC address, wherein the other PPP control data indicates a request for an echo; and determining that a data packet with the particular MAC address in an Ethernet source field is received within a particular time interval, wherein receiving the data packet within the particular time interval is used as a basis for presuming that a persistent session is active and prompts a new time window to be initiated for determining whether the persistent session continues to be active.

4. The method of claim 1, wherein failures to detect a response from requests for an echo are used as a basis for terminating corresponding persistent sessions.

5. The method of claim 1, further comprising using the particular PPP control data to authenticate a user.

6. The method of claim 1, further comprising using the particular PPP control data to test a performance metric of a link associated with the persistent session.

7. The method of claim 1, wherein the particular header data includes a type field indicating that PPP data plane data is contained in the payload of the first data link protocol.

8. The method of claim 1, wherein the other header data includes a type field indicating that the PPP control plane data is contained in the payload of the second data link protocol.

9. The method of claim 8, further comprising determining, from the other header data, that the other inbound data packet includes PPP control plane data.

10. The method of claim 1, wherein each of the particular and other header data exclude at least a portion of point-to-point protocol over Ethernet (PPPoE) protocol header data.

11. The method of claim 1, wherein the first data link protocol comprises IP-over-Ethernet.

12. The method of claim 11, wherein the PPP data plane data comprises an IP datagram from a PPP payload of the PPP traffic.

13. The method of claim 1, wherein the second data link protocol is a modified Ethernet protocol.

14. The method of claim 1, wherein the particular and other inbound data packets and received substantially simultaneously.

* * * * *